(12) United States Patent
Suzuki et al.

(10) Patent No.: US 11,886,185 B2
(45) Date of Patent: Jan. 30, 2024

(54) VEHICLE REMOTE CONTROL METHOD AND VEHICLE REMOTE CONTROL DEVICE

(71) Applicants: Nissan Motor Co., Ltd., Yokohama (JP); Renault S.A.S., Boulogne-Billancourt (FR)

(72) Inventors: Yasuhiro Suzuki, Kanagawa (JP); Junya Kobayashi, Kanagawa (JP); Yasuhiro Sakurai, Kanagawa (JP); Ryota Yamanaka, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/641,320

(22) PCT Filed: Sep. 9, 2019

(86) PCT No.: PCT/IB2019/001119
§ 371 (c)(1),
(2) Date: Mar. 8, 2022

(87) PCT Pub. No.: WO2021/048586
PCT Pub. Date: Mar. 18, 2021

(65) Prior Publication Data
US 2022/0350326 A1 Nov. 3, 2022

(51) Int. Cl.
*G05D 1/00* (2006.01)
*B60W 30/06* (2006.01)
*B60W 50/14* (2020.01)

(52) U.S. Cl.
CPC .......... *G05D 1/0016* (2013.01); *B60W 30/06* (2013.01); *B60W 50/14* (2013.01); *G05D 1/0038* (2013.01)

(58) Field of Classification Search
CPC .... B60W 30/06; B60W 50/14; G05D 1/0016; G05D 1/0038
(Continued)

(56) References Cited

U.S. PATENT DOCUMENTS 10,384,605 B1   8/2019  Golgiri et al.
2015/0375741 A1* 12/2015 Kiriya ................. G06V 40/28
                                                  701/2
(Continued)

FOREIGN PATENT DOCUMENTS

JP   2005-041433 A   2/2005
JP   2016-007959 A   1/2016
(Continued)

*Primary Examiner* — Peter D Nolan
*Assistant Examiner* — Luke Huynh
(74) *Attorney, Agent, or Firm* — Young Basile Hanlon & MacFarlane, P.C.

(57) ABSTRACT

The relative position between a vehicle and an extension unit located outside the vehicle is detected, and a command touch operation for operating the vehicle with a remote operation device is set in accordance with the detected relative position. The touch operation of an operator is detected by a touch panel of the remote operation device, and a determination is made as to whether or not the detected touch operation is the command touch operation. When the touch operation is the command touch operation, the vehicle is controlled to execute autonomous travel control. The vehicle has an autonomous travel control function.

18 Claims, 17 Drawing Sheets

(58) Field of Classification Search
USPC .............................................................. 701/2
See application file for complete search history.

(56) References Cited

U.S. PATENT DOCUMENTS

| | | | |
|---|---|---|---|
| 2016/0170494 A1* | 6/2016 | Bonnet | B60K 35/00 |
| | | | 345/173 |
| 2019/0064822 A1 | 2/2019 | Gorg | |
| 2019/0202348 A1* | 7/2019 | Elangovan | B60Q 1/48 |
| 2019/0202443 A1* | 7/2019 | Lavoie | B60W 30/06 |
| 2020/0218250 A1* | 7/2020 | Fuke | G06F 18/22 |

FOREIGN PATENT DOCUMENTS

| | | |
|---|---|---|
| JP | 2019-119231 A | 7/2019 |
| WO | 2018/083799 A1 | 5/2018 |

* cited by examiner

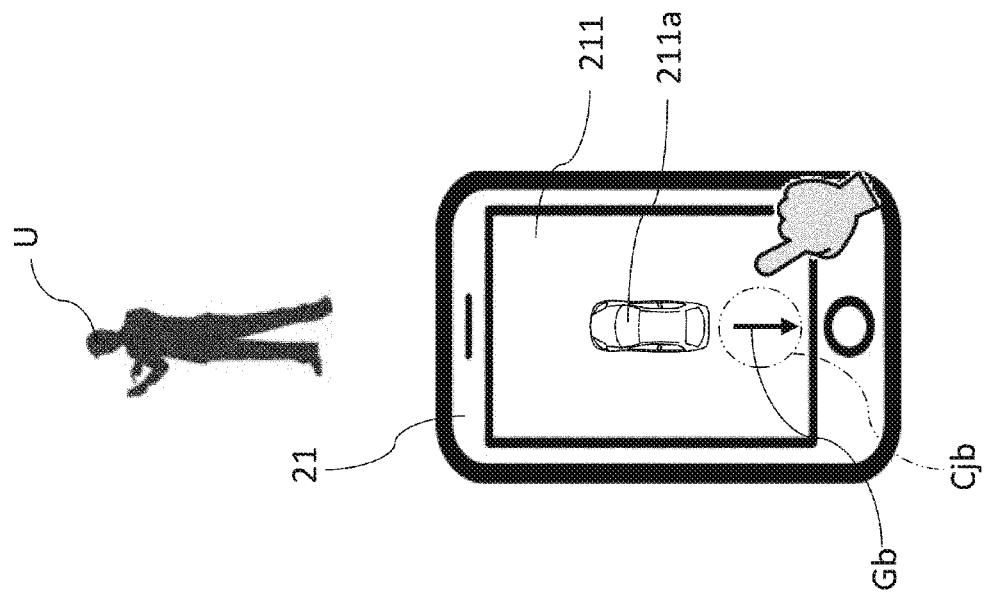
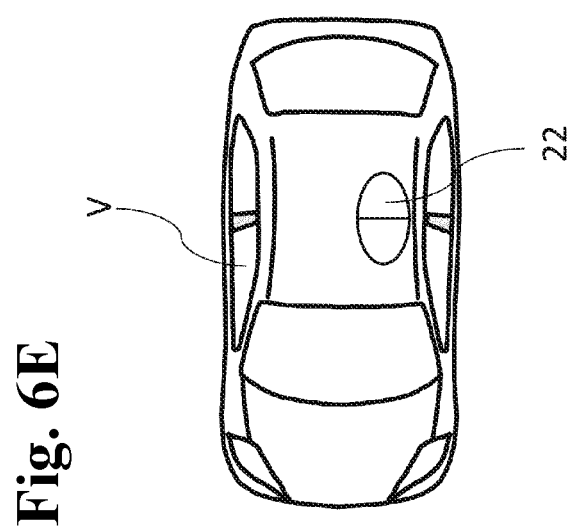
Fig. 6E

Fig. 7
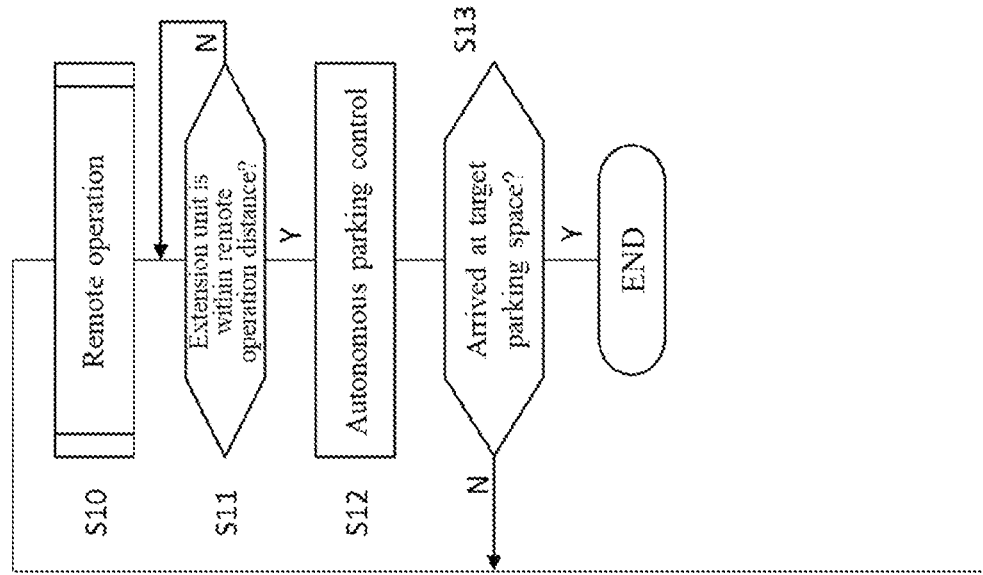
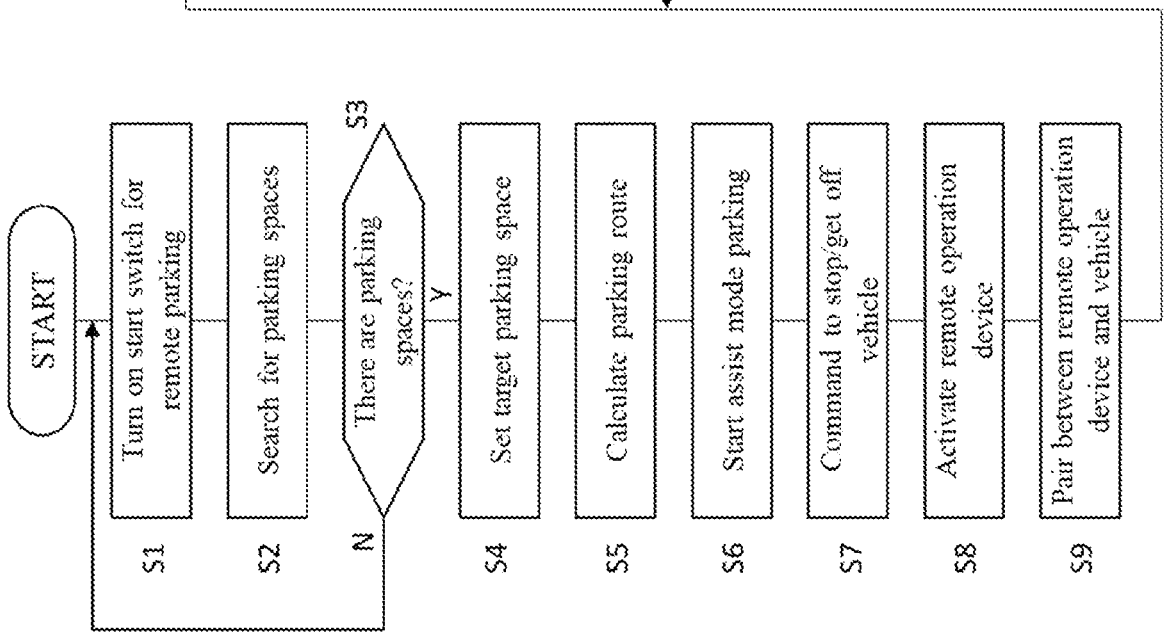

VEHICLE REMOTE CONTROL METHOD AND VEHICLE REMOTE CONTROL DEVICE

TECHNICAL FIELD

The present invention relates to a vehicle remote control method and a vehicle remote control device that allow a vehicle having an autonomous travel control function to autonomously travel by remote operation.

BACKGROUND

A method for remote control of a vehicle is known (US2016/0170494A). In this method, a gesture is input to the touch panel of a remote operation device for the vehicle. When the input gesture corresponds to a predefined gesture, the vehicle is allowed to execute a predetermined function allocated to the gesture.

The international standard for autonomous travel control of a vehicle defines a condition for permitting the remote operation of a vehicle, in which the distance between the vehicle and the operator who operates a remote operation device is within a predetermined remote operation distance (e.g., within 6 m). Vehicles to which a vehicle remote control method is applied with a remote operation device include those using the extension unit of a keyless entry system, which locks and unlocks the doors or performs other operations via wireless communication, to measure the distance between a vehicle and an operator and the position with respect to the vehicle. In such a vehicle, an operator such as a driver remotely operates the vehicle from outside in a state of carrying the extension unit and the remote operation device. Therefore, if the distance between the extension unit and the vehicle is calculated via wireless communication between the extension unit and the vehicle, a determination can be made as to whether or not the operator is operating the remote operation device at a position within a remote operation distance from the vehicle.

SUMMARY

The operator, however, may place the extension unit in the vehicle or on the roof, for example, and operate the remote operation device without carrying the extension unit.

A problem to be solved by the present invention is to provide a vehicle remote control method and a vehicle remote control device that are able to prompt the operator to operate the remote operation device in a state of carrying the extension unit.

In the present invention, a command touch operation for operating a vehicle with a remote operation device is set in accordance with the relative position between the vehicle and an extension unit located outside the vehicle, and when the touch operation detected by a touch panel of the remote operation device is the command touch operation, the vehicle is controlled to execute autonomous travel control.

According to the present invention, the autonomous travel control of the vehicle is executed when the touch operation detected by the touch panel of the remote operation device is the command touch operation which is set in accordance with the relative position between the vehicle and the extension unit, and it is therefore possible to prompt the operator to operate the remote operation device in a state of carrying the extension unit.

BRIEF DESCRIPTION OF THE DRAWINGS

FIG. 6E is an explanatory diagram illustrating a state in which the extension unit is placed on the roof of the subject vehicle and the operator does not carry the extension unit;

FIG. 7 is a flowchart illustrating a control procedure executed in the remote parking system of FIG. 1;

DETAILED DESCRIPTION

First Embodiment

Figure 1:
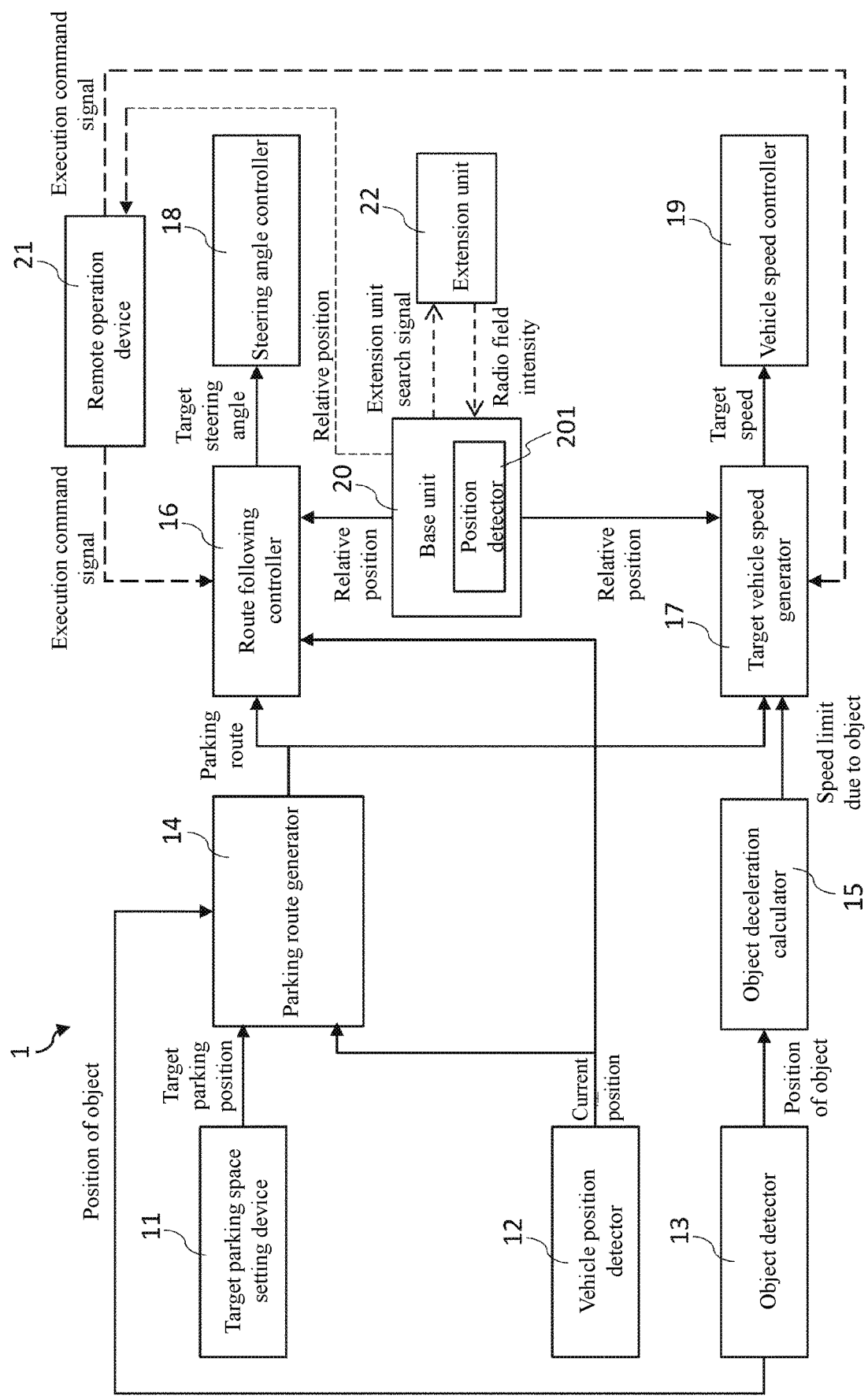
FIG. 1 is a block diagram illustrating a remote parking system to which the vehicle remote control method and vehicle remote control device of the present invention are applied.

Hereinafter, an embodiment of the present invention will be described with reference to the drawings. FIG. 1 is a block diagram illustrating a remote parking system 1 to which the remote control method and remote control device for a vehicle of the present invention are applied. In the present specification, "autonomous travel control" refers to controlling a vehicle to travel through automated or autonomous control executed by an onboard travel control device without relying on a driver's driving operation, while "autonomous parking control," which is one type of the autonomous travel control, refers to controlling a vehicle to park (enter or exit a parking space or a garage) through automated or autonomous control executed by an onboard travel control device without relying on a driver's driving operation. Also in the present specification, "parking" refers to a vehicle being continuously stopped in a parking space, and the term "travel route" encompasses not only a parking route in the case of entry into a parking space or a garage but also a route for exit from a parking space or a garage. In this sense, the "vehicle travel control method and vehicle travel control device used when parking" encompass both the travel control of a vehicle at the time of entry into a parking space or a garage and the travel control of a vehicle at the time of exit from a parking space or a garage. The entry into a parking space or a garage may be simply referred to as entry or entering, and the exit from a parking space or a garage may be simply referred to as exit or exiting.

In the following embodiments, specific examples of the present invention will be described with reference to an example in which the remote control method and remote control device according to the present invention are applied to a remote parking system in which a remote-controlled vehicle is parked by autonomous travel control. The remote parking system 1 of the present embodiment performs the autonomous travel control in an assist mode in which an operator such as a driver gets on a vehicle and an intervention operation performed by the operator is possible. After that, the operator gets off the vehicle and performs the autonomous travel control from outside the vehicle in a remote control mode using a remote operation device.

The remote parking system 1 according to the present embodiment is a system for performing the operation of entry into or exit from a parking space or a garage by the autonomous travel control when performing the operation. More specifically, the driver gets off the vehicle in mid-course of the entry into a parking space or a garage and continues to transmit an execution command signal from a remote operation device while confirming safety, and the vehicle thereby continues the autonomous parking control. When the vehicle may collide with an obstacle, the autonomous parking control is stopped by pausing transmission of the execution command signal from the remote operation device. In the following description, the autonomous travel control mode in which an operator such as a driver gets on the vehicle and can perform the intervention operation will be referred to as an assist mode, and the autonomous travel control mode in which the operator gets off the vehicle and performs the operation of entry into or exit from a parking space or a garage with the use of remote operation will be referred to as a remote control mode.

In a narrow parking space in which side doors cannot be fully opened, such as a narrow garage or a parking lot in which other vehicles are parked on both sides, for example, it may be difficult for the driver to get on or get off the vehicle. To enable the parking even in such a case, the remote control mode can be used together with the remote operation. When performing the entry into a parking space in the remote control mode, after the remote control mode is initiated to calculate the entry route into the selected parking space and start the autonomous parking control, the driver gets off the vehicle while carrying the remote operation device. The driver who has got off the vehicle continues to transmit the execution command signal from the remote operation device to the vehicle to complete the entry into the selected parking space. On the other hand, when performing the exit from the parking space, the driver turns on the internal combustion engine or drive motor of the vehicle using the remote operation device carried by the driver, and after the remote exit mode is initiated to calculate the exit route to a selected exit position and start the autonomous exit control, the driver continues to transmit the execution command signal from the remote operation device to complete the exit from the parking space and then gets on the vehicle. Thus, the remote parking system 1 of the present embodiment is a system having such a remote control mode with the use of the remote operation. An example of the autonomous parking control will be exemplified as autonomous reverse parking control illustrated in FIG. 2, but the present invention can also be applied to the exit from a parking space or a garage, autonomous parallel parking, and other autonomous parking.

The remote parking system 1 of the present embodiment includes a target parking space setting device 11, a vehicle position detector 12, an object detector 13, a parking route generator 14, an object deceleration calculator 15, a route following controller 16, a target vehicle speed generator 17, a steering angle controller 18, a vehicle speed controller 19, a base unit 20, a remote operation device 21, and an extension unit 22. The target parking space setting device 11, vehicle position detector 12, object detector 13, parking route generator 14, object deceleration calculator 15, route following controller 16, target vehicle speed generator 17, steering angle controller 18, vehicle speed controller 19, and base unit 20 are equipped in the vehicle. The remote operation device 21 and extension unit 22 are carried by an operator such as a driver. Each configuration will be described below.

In the remote control mode, the target parking space setting device 11 searches for parking spaces existing around the subject vehicle and allows the operator to select a desired parking space from among available parking spaces. In addition, the target parking space setting device 11 outputs positional information of the selected parking space (such as the coordinates of a relative position from the current position of the subject vehicle and the latitude/longitude) to the parking route generator 14.

To achieve the above-described functions, the target parking space setting device 11 includes an input switch, a plurality of cameras, a parking space detector, and a touch panel-type display (none of which are illustrated). The input switch selectively selects the remote control mode or the assist mode. The plurality of cameras captures images around the vehicle. The cameras of the target parking space setting device 11 may also be used as one or more cameras of the object detector 13, which will be described later. The parking space detector is a computer that is installed with a software program for searching for available parking spaces from the image data captured by the cameras. The touch panel-type display is used for display of the detected parking spaces and selection of a parking space.

When an operator such as a driver selects the remote control mode using the input switch, the target parking space setting device 11 uses the plurality of cameras to acquire the image data around the subject vehicle and analyzes the image data to detect available parking spaces. In addition, the target parking space setting device 11 displays an image including the available parking spaces on the touch panel-type display and prompts the operator to select a parking space in which the operator wants to park the vehicle. When the operator selects a desired parking space from among the displayed parking spaces, the target parking space setting device 11 outputs the positional information of that parking space to the parking route generator 14. Upon search for the available parking spaces, when the map information stored in a navigation device includes parking lot information having detailed positional information, the parking lot information may be used.

The vehicle position detector 12 is composed of a GPS unit, a gyro sensor, a vehicle speed sensor, and other components. The GPS unit detects radio waves transmitted from a plurality of satellite communications and periodically acquires positional information of the subject vehicle. The vehicle position detector 12 detects the current position of the subject vehicle based on the positional information of the subject vehicle acquired by the GPS unit, the angle change information acquired from the gyro sensor, and the vehicle speed acquired from the vehicle speed sensor. The positional information of the subject vehicle detected by the vehicle position detector 12 is output to the parking route generator 14 and the route following controller 16 at predetermined time intervals.

The object detector 13 is configured to search for whether or not an object such as an obstacle is present around the subject vehicle. The object detector 13 includes one or more cameras, radar (such as millimeter-wave radar, laser radar, or ultrasonic radar), sonar, or the like or a combination thereof. The cameras, radar, sonar, or the like or a combination thereof is attached to an outer panel part of the subject vehicle. The position to which the object detector 13 is attached is not particularly limited. One or more object detectors 13 can be attached, for example, to all or part of sites of the center and both sides of the front bumper, the center and both sides of the rear bumper, the sill outers below the right and left center pillars, and the like.

Each object detector 13 further includes a computer that is installed with a software program for specifying the position of an object detected by the cameras, radar, or the like. This computer outputs the specified object information (target object information) and its positional information (such as the coordinates of a relative position from the current position of the subject vehicle and the latitude/longitude) to the parking route generator 14 and the object deceleration calculator 15. Before the start of the autonomous parking control, the specified object information and its positional information are used by the parking route generator 14 to generate a parking route. During the autonomous parking control, the object information and its positional information are used by the object deceleration calculator 15 for control of decelerating or stopping the subject vehicle when an object such as an abrupt obstacle is detected.

The parking route generator 14 calculates a parking route from the current position of the subject vehicle to the target parking position (the parking route refers to the entry route in the case of the remote control mode, here and hereinafter). The parking route is calculated so as not to collide or interfere with an object. Calculation of the parking route includes using the size of the subject vehicle (such as a vehicle width, a vehicle length, or a minimum turning radius) which is preliminarily stored, the target parking position (which refers to the positional information of the parking space in the case of the remote control mode, here and hereinafter) from the target parking space setting device 11, the current positional information of the subject vehicle from the vehicle position detector 12, and the positional information of an object (obstacle) from the object detector 13.

Figure 2:
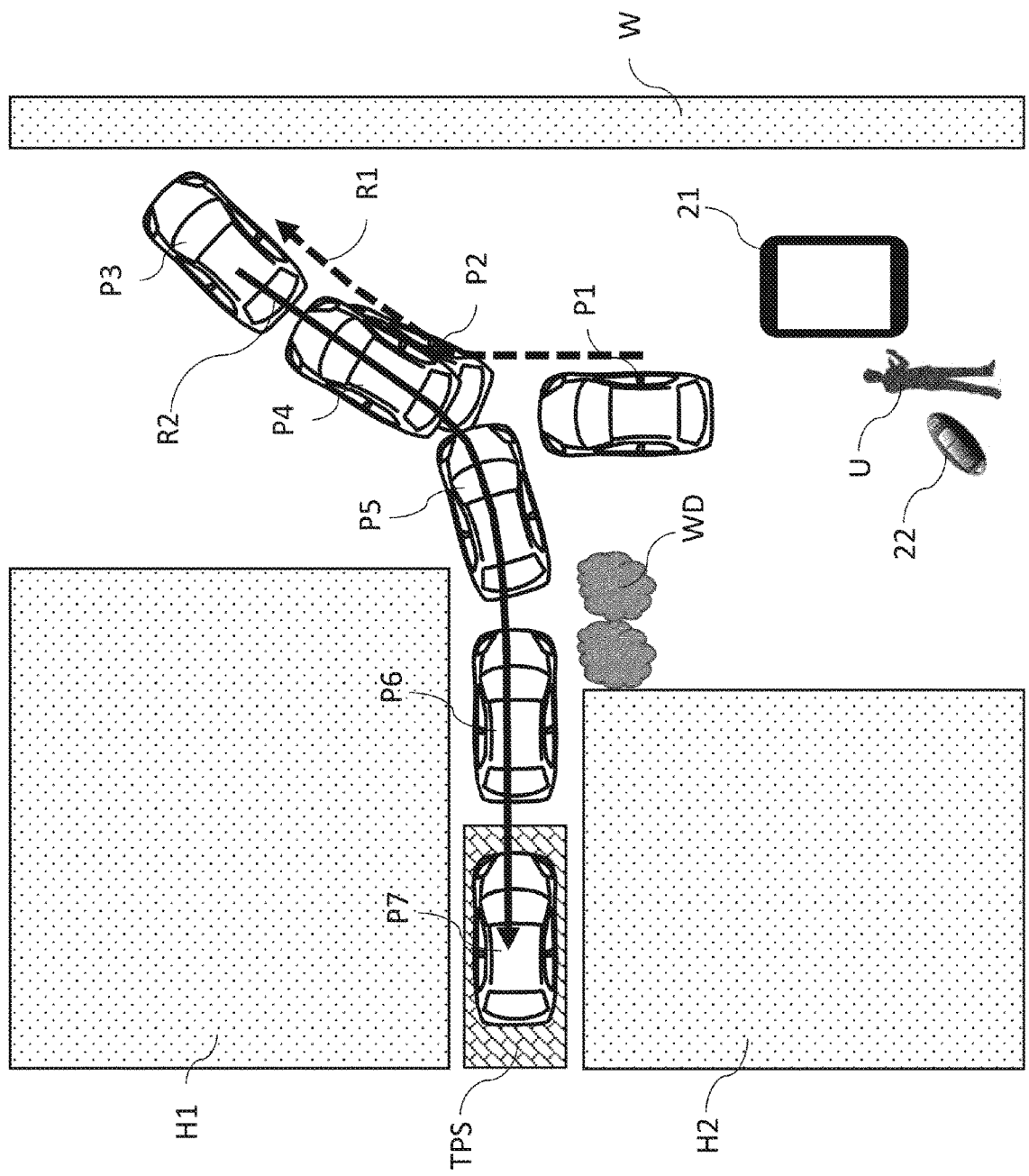
FIG. 2 is a plan view illustrating an example of remote reverse parking executed in the remote parking system of FIG. 1.

FIG. 2 is a plan view illustrating an example of the remote control mode. At a current position P1 of a subject vehicle V illustrated in FIG. 2, when an operator U such as the driver operates the input switch inside the vehicle to select the remote control mode, the target parking space setting device 11 searches for available parking spaces TPSs and displays an image including the parking spaces TPSs on a display. In response to this, when the operator U selects a parking space TPS, the parking route generator 14 calculates a parking route R1 from the current position P1 to a position of turn for parking P3 via a position P2 and a parking route R2 from the position of turn for parking P3 to a position P7 in the parking space TPS which is the target via an intermediate stop position P4 and positions P5 and P6. Then, the parking route generator 14 outputs this series of the parking routes R1 and R2 to the route following controller 16 and the target vehicle speed generator 17.

The object deceleration calculator 15 receives the positional information of obstacles and other objects from the object detector 13 and calculates the time for the subject vehicle to collide with an object (TTC: Time to Collision) based on the distance from the object and the vehicle speed, thus calculating the deceleration start timing of the subject vehicle. For example, in the remote control mode illustrated in FIG. 2, objects as obstacles include a wall W on the right side of the road at the position of turn for parking P3, houses H1 and H2 on both the right and left sides of the parking route R2 to the target parking space TPS, and garden trees WD. When determining that the distance from such an obstacle is a predetermined value or more, the object deceleration calculator 15 sets the vehicle speed to an initial set value and decelerates the vehicle speed of the subject vehicle V at the timing when the time TTC for the subject vehicle V to collide with the obstacle becomes a predetermined value or less. Likewise, when an abrupt obstacle is detected on the parking route R1 or R2 during execution of the sequential autonomous parking control illustrated in FIG. 2, the subject vehicle V is decelerated or stopped at the timing when the time TTC for the subject vehicle V to collide with the obstacle becomes a predetermined value or less. This deceleration start timing is output to the target vehicle speed generator 17.

The route following controller 16 calculates, at predetermined time intervals, a target steering angle for the subject vehicle to follow the parking routes based on the parking routes from the parking route generator 14 and the current position of the subject vehicle from the vehicle position detector 12. As for the parking routes R1 and R2 of FIG. 2, the route following controller 16 calculates, at a predetermined time interval for each current position of the subject vehicle V, the target steering angle along the parking route R1 for traveling straight ahead and turning right from the current position P1 to the position of turn for parking P3. Likewise, the route following controller 16 calculates, at a predetermined time interval for each current position of the subject vehicle V, the target steering angle along the parking route R2 for turning left and traveling straight ahead from the position of turn for parking P3 to the parking space TPS. The route following controller 16 outputs the calculated target steering angles to the steering angle controller 18.

The target vehicle speed generator 17 calculates, at predetermined time intervals, a target vehicle speed for the subject vehicle V to follow the parking routes based on the parking routes from the parking route generator 14 and the deceleration start timing from the object deceleration calculator 15. As for the entry routes R1 and R2 of FIG. 2, the target vehicle speed generator 17 calculates, at a predetermined time interval for each current position of the subject vehicle V, the target vehicle speed when starting from the current position P1, traveling straight ahead and turning right, and stopping at the position of turn for parking P3 and outputs the calculated target vehicle speed to the vehicle speed controller 19. Likewise, the target vehicle speed generator 17 calculates, at a predetermined time interval for each current position of the subject vehicle V, the target vehicle speed when starting again (moving backward) from the position of turn for parking P3 and turning left on the way to the target parking space TPS and the target vehicle speed when approaching the target parking space TPS and stopping there and outputs the calculated target vehicle speeds to the vehicle speed controller 19. When an abrupt obstacle is detected on the parking route R1 or R2 during execution of the sequential autonomous parking control illustrated in FIG. 2, the timing of deceleration or stopping is output from the object deceleration calculator 15, and the target vehicle speed generator 17 therefore outputs the target vehicle speed to the vehicle speed controller 19 in accordance with that timing.

The steering angle controller 18 generates a control signal for operating a steering actuator provided in the steering system of the subject vehicle V based on the target steering angle from the route following controller 16. The vehicle speed controller 19 also generates a control signal for operating an accelerator actuator provided in the drive system of the subject vehicle V based on the target vehicle speed from the target vehicle speed generator 17. The steering angle controller 18 and the vehicle speed controller 19 are concurrently controlled thereby to execute the autonomous parking control.

The extension unit 22 and the base unit 20 will then be described. The international standard for autonomous travel control of a vehicle defines a condition for permitting the remote operation of a vehicle, in which the distance between the vehicle and the operator is within a predetermined remote operation distance (e.g., within 6 m). In the remote parking system 1 of the present embodiment, therefore, the extension unit 22 carried by the operator U and the base unit 20 equipped in the subject vehicle V are used to detect the relative position of the extension unit 22 with respect to the subject vehicle V, that is, the relative position of the operator U, who carries the extension unit 22, with respect to the subject vehicle V. The extension unit 22 and the base unit 20 constitute a so-called keyless entry system. The keyless entry system is a system configured such that when the operator U such as the driver approaches the subject vehicle V within a predetermined distance in a state of carrying the extension unit 22, wireless communication is established between the base unit 20 equipped in the subject vehicle V and the extension unit 22 to perform automated unlocking of the door lock or the like.

Figure 3:
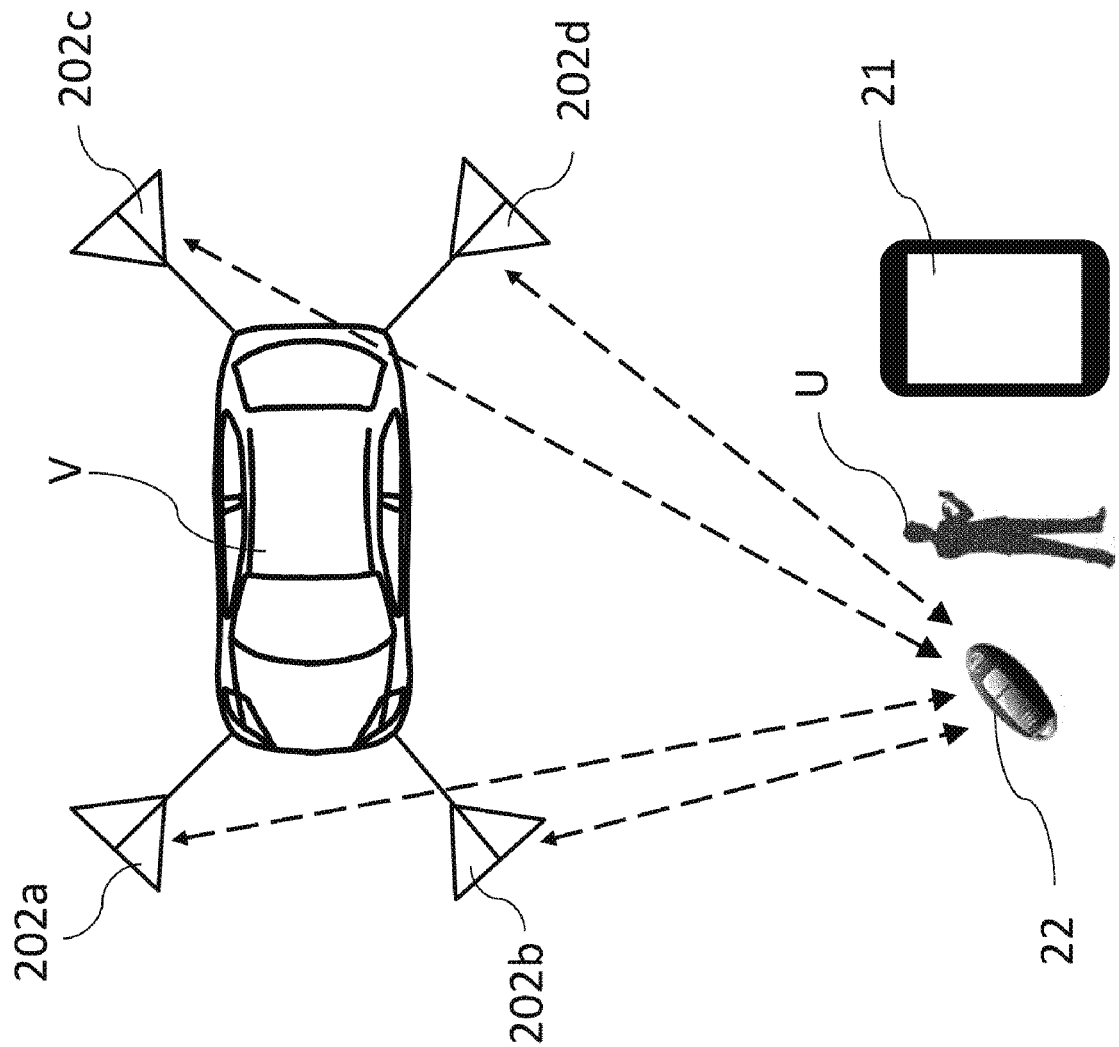
FIG. 3 is an explanatory diagram illustrating a state of detecting the relative position of an extension unit of FIG. 1 with respect to a subject vehicle.

In the present embodiment, as illustrated in FIG. 3, for example, antennas 202a to 202d connected to the base unit 20 are installed at predetermined sites of the subject vehicle V. The base unit 20 transmits extension unit search signals from the antennas 202a to 202d. When approaching the subject vehicle V within a predetermined distance, the extension unit 22 receives the extension unit search signals transmitted from the antennas 202a to 202d and measures the radio field intensity of the extension unit search signal from each of the antennas 202a to 202d. The radio field intensity of the extension unit search signal varies depending on the distance between the extension unit 22 and each of the antennas 202a to 202d. That is, when the extension unit 22 is present near the antenna 202b in the vicinity of the left side of the front bumper, the radio field intensity of the extension unit search signal received from the antenna 202b is the strongest, while the radio field intensity of the extension unit search signal received from the antenna 202c in the vicinity of the right side of the rear bumper is the weakest.

The extension unit 22 transmits the measured radio field intensity of the extension unit search signal from each of the antennas 202a to 202d to the base unit 20. The base unit 20 has a position detector 201 that is, for example, a computer installed with a software program for calculating the position of the extension unit 22 from the radio field intensities of the antennas 202a to 202d received from the extension unit 22, such as by using a triangulation method. On the basis of the radio field intensities of the antennas 202a to 202d received from the extension unit 22, the position detector 201 detects the relative position of the extension unit 22 with respect to the subject vehicle V, that is, the relative position of the operator U, who carries the extension unit 22, with respect to the subject vehicle V. The position detector 201 outputs the detected relative position of the extension unit 22 to the route following controller 16 and the target vehicle speed generator 17 (these may alternatively be the steering angle controller 18 and the vehicle speed controller 19) and transmits the detected relative position of the extension unit 22 to the remote operation device 21.

The remote operation device 21 is a device for the operator U to command from outside the vehicle as to whether to continue or stop the execution of the autonomous parking control which is set by the target parking space setting device 11. The remote operation device 21 therefore has a wireless communication function for transmitting the execution command signal to the route following controller 16 and the target vehicle speed generator 17 (these may alternatively be the steering angle controller 18 and the vehicle speed controller 19) and performs communication with a wireless communication function of the subject vehicle V.

The remote operation device 21 is provided, for example, as a mobile information terminal such as a smartphone installed with application software for remote control (referred to as an application, hereinafter). The smartphone installed with the application serves as the remote operation device 21 of the remote parking system 1 by activating the application.

The international standard for autonomous travel control of a vehicle defines that the vehicle is allowed to execute the autonomous travel control only while the operator continuously operates the remote operation device. In the remote parking system 1 of the present embodiment, therefore, the execution command signal is continued to be transmitted from the remote operation device 21 to the subject vehicle V only while a predetermined command touch operation is continuously input to a touch panel 211 of the remote operation device 21. The subject vehicle V executes the autonomous parking control only while receiving the execution command signal transmitted from the remote operation device 21. That is, when the input of the command touch operation to the remote operation device 21 is stopped, the execution command signal becomes not transmitted from the remote operation device 21 to the vehicle, and the execution of the autonomous parking control of the vehicle is suspended or stopped. To control the vehicle parked in a narrow parking space to exit the parking space by the remote operation from outside the vehicle, the remote operation device 21 further has a function of activating the drive source such as an engine or a motor of the vehicle by the remote operation.

Figure 4:
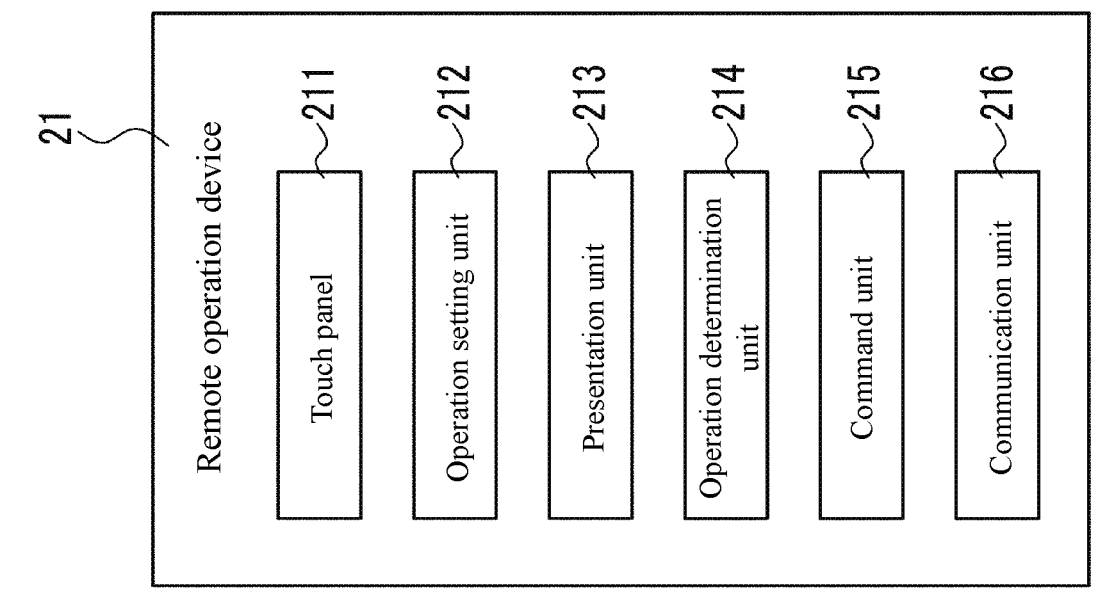
FIG. 4 is a block diagram illustrating the configuration of a remote operation device of FIG. 1.

As illustrated in FIG. 4, the remote operation device 21 includes a touch panel 211, an operation setting unit 212, a presentation unit 213, an operation determination unit 214, a command unit 215, and a communication unit 216. The operation setting unit 212 sets, in accordance with the relative position between the subject vehicle V and the extension unit 22, a command touch operation for remotely operating the subject vehicle V by the remote operation device 21 and a command determination area that receives the command touch operation. The presentation unit 213 presents command touch operation input information that prompts the operator U to input the command touch operation. The touch panel 211 detects the command touch operation which is input by the touch operation of the operator U. The operation determination unit 214 determines whether or not the touch operation detected by the touch panel 211 is the command touch operation which is input to the set command determination area. When the detected touch operation is the command touch operation, the command unit 215 generates an execution command signal for the subject vehicle V to execute the autonomous parking control using the autonomous travel control function. The communication unit 216 transmits the execution command signal generated in the command unit 215 to the subject vehicle V.

Examples of the command touch operation include a touch operation of pressing a predetermined position on the touch panel 211, a button displayed on the touch panel 211, or the like a predetermined number of times or more or for a predetermined time or more and a gesture operation of sliding a finger on the touch panel 211. The present embodiment will be described for an example of using such a gesture operation as the command touch operation.

Figure 5:
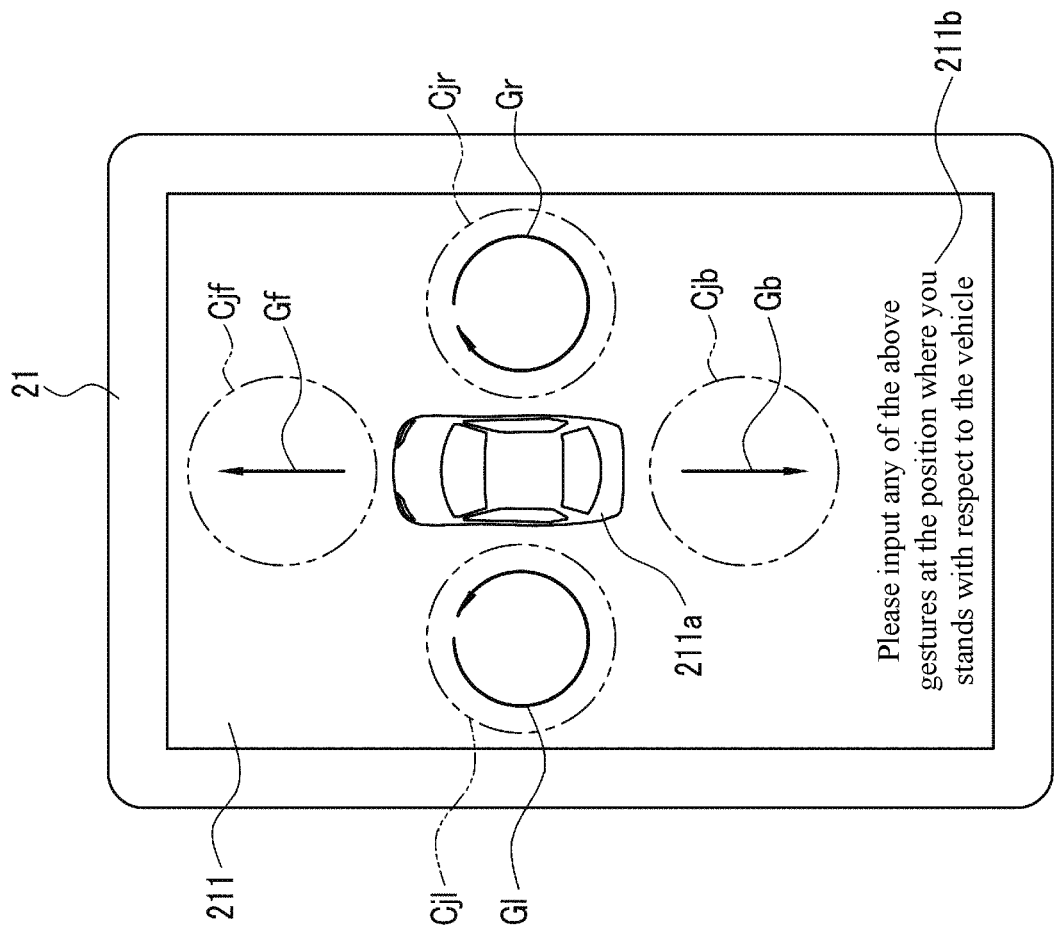
FIG. 5 is an explanatory diagram illustrating a state in which the remote operation device of FIG. 1 displays a gesture that is input and gesture input information.

Each part of the remote operation device 21 will be described below. The touch panel display of a smartphone that serves as the remote operation device 21 is used as the touch panel 211. In the remote control mode, as illustrated in FIG. 5, the touch panel 211 displays a vehicle image 211a. The vehicle image 211a is an overhead view image of the subject vehicle V as viewed from above. In the example illustrated in FIG. 5, the vehicle image 211a is displayed so that the front-rear direction of the vehicle image 211a is along the up-down direction of the touch panel 211.

Figure 6A:
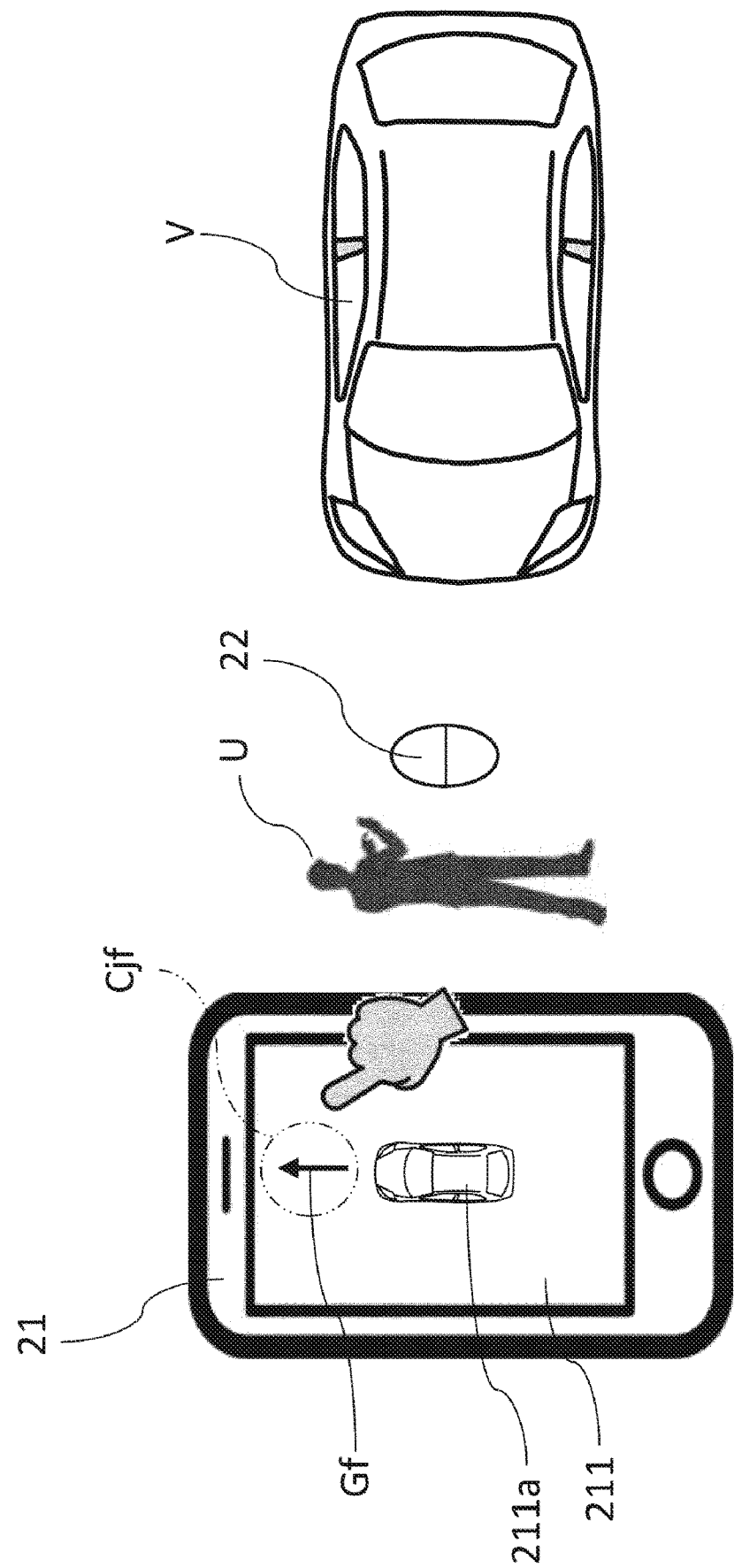
FIG. 6A is an explanatory diagram illustrating a command gesture and a first input position when the extension unit is present ahead of the subject vehicle.

The operation setting unit 212 sets the type of the command touch operation and a command determination area in which the command touch operation is input, based on the relative position between the subject vehicle V and the extension unit 22. The relative position is acquired from the position detector 201. As illustrated in FIG. 6A, for example, when the relative position of the extension unit 22 with respect to the subject vehicle V is located ahead of the subject vehicle V, the operation setting unit 212 sets an area located ahead of the vehicle image 211a as a command determination area (referred to as a front command determination area, hereinafter) Cjf. For the front command determination area Cjf, the operation setting unit 212 sets, as a specified command touch operation, a command gesture Gf of sliding a finger frontward ahead of the vehicle image 211a along the front-rear direction of the vehicle image 211a.

Figure 6B:
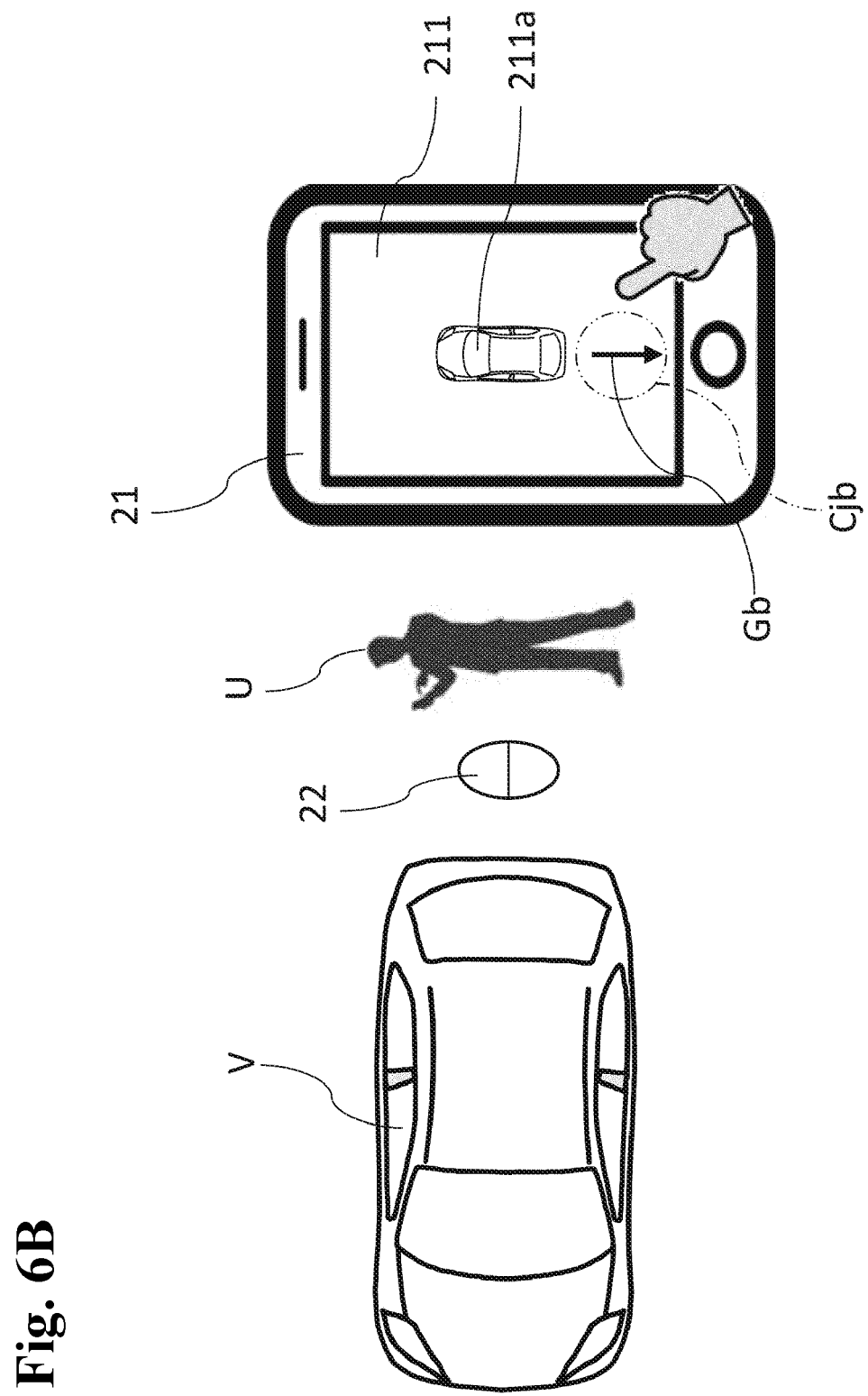
FIG. 6B is an explanatory diagram illustrating a command gesture and a first input position when the extension unit is present behind the subject vehicle.

Additionally or alternatively, as illustrated in FIG. 6B, when the relative position of the extension unit 22 with respect to the subject vehicle V is located behind the subject vehicle V, the operation setting unit 212 sets an area located behind the vehicle image 211a as a command determination area (referred to as a rear command determination area, hereinafter) Cjb. For the rear command determination area Cjb, the operation setting unit 212 sets, as a specified command touch operation, a command gesture Gb of sliding a finger rearward behind the vehicle image 211a along the front-rear direction of the vehicle image 211a.

Figure 6C:
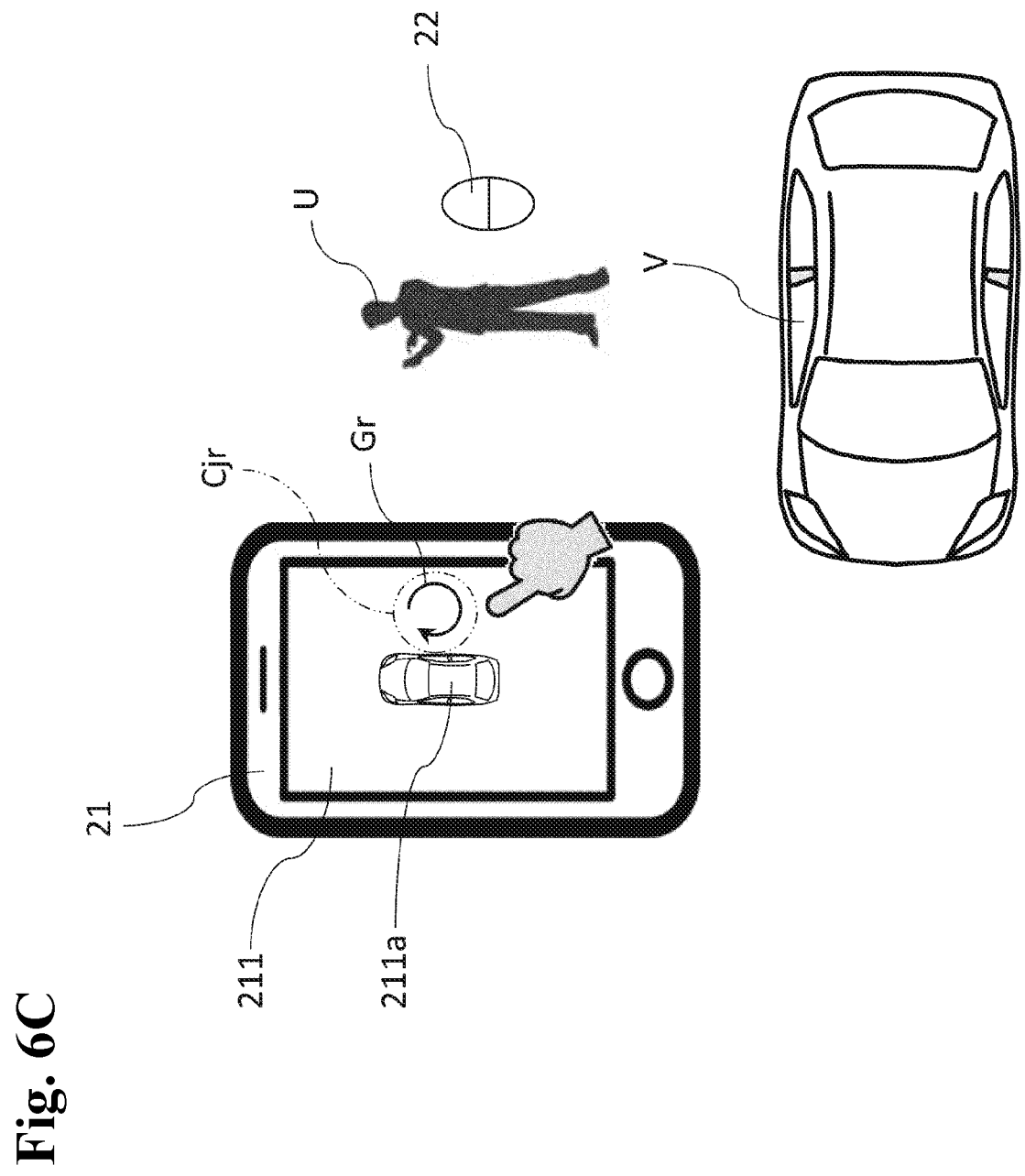
FIG. 6C is an explanatory diagram illustrating a command gesture and a first input position when the extension unit is present on the right side of the subject vehicle.

Additionally or alternatively, as illustrated in FIG. 6C, when the relative position of the extension unit 22 with respect to the subject vehicle V is located on the right side of the subject vehicle V, the operation setting unit 212 sets an area located on the right side of the vehicle image 211a as a command determination area (referred to as a right-side command determination area, hereinafter) Cjr. For the right-side command determination area Cjr, the operation setting unit 212 sets, as a specified command touch operation, a command gesture Gr of drawing a circular-shaped figure in the clockwise direction (a first circumferential direction).

Figure 6D:
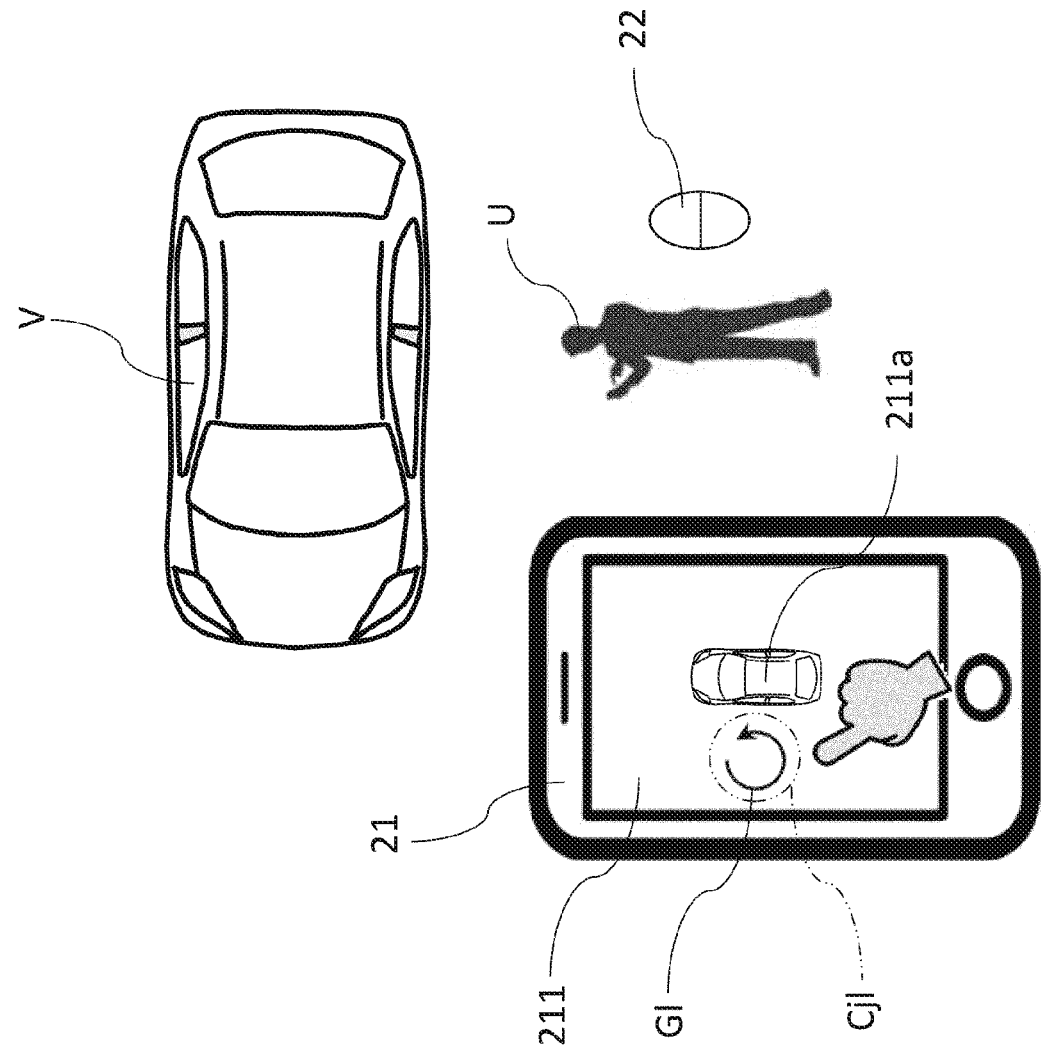
FIG. 6D is an explanatory diagram illustrating a command gesture and a first input position when the extension unit is present on the left side of the subject vehicle.

Additionally or alternatively, as illustrated in FIG. 6D, when the relative position of the extension unit 22 with respect to the subject vehicle V is located on the left side of the subject vehicle V, the operation setting unit 212 sets an area located on the left side of the vehicle image 211a as a command determination area (referred to as a left-side command determination area, hereinafter) Cjl. For the left-side command determination area Cjl, the operation setting unit 212 sets, as a specified command touch operation, a command gesture Gl of drawing a circular-shaped figure in the counterclockwise direction (a second circumferential direction).

The presentation unit 213 presents command touch operation input information to the operator U in accordance with the relative position of the operator U with respect to the subject vehicle V. The command touch operation input information is for prompting the operator U to input a predetermined command touch operation in a predetermined command determination area. For example, in the example illustrated in FIG. 5, the presentation unit 213 presents command touch operation input information 211b that states "Please input any of the above gestures at the position where you stand with respect to the vehicle." This can prompt the operator U to input a predetermined command touch operation in a predetermined command determination area in accordance with the relative position of the operator U with respect to the subject vehicle V.

For example, as illustrated in FIG. 6A, when the operator U is located ahead of the subject vehicle V, the command gesture Gf represents the command touch operation which is input by the operator U, and the front command determination area Cjf represents the predetermined command determination area. Likewise, as illustrated in FIG. 6C, when the operator U is located on the right side of the subject vehicle V, the command gesture Gr represents the command touch operation which is input by the operator U, and the front command determination area Cjr represents the predetermined command determination area. The command touch operation input information 211b may be presented by voice or together with voice.

As the central processing unit (CPU) of a smartphone that serves as the remote operation device 21 operates in accordance with the application, the operation determination unit 214 functions. The operation determination unit 214 determines whether the gesture detected by the touch panel 211 is input to the command determination area set by the operation setting unit 212 and is the command gesture set by the operation setting unit 212 and whether the input speed of the command gesture is within a predetermined range. The reason why the input speed of the gesture is used for determining the command gesture is to distinguish a gesture that is input due to some object touching the touch panel 211 from the gesture of the operator U.

The operation determination unit 214 determines whether or not the input gesture is a command gesture by the following procedure. First, the operation determination unit 214 determines whether or not a gesture is input to the command determination area set by the operation setting unit 212. When a gesture is input to the set command determination area, the operation determination unit 214 determines whether or not the input gesture is a command gesture. Furthermore, when the input gesture is a command gesture, the operation determination unit 214 determines whether or not the input speed of the gesture is within a predetermined range. That is, when the input position of the gesture is within the set command determination area, the input gesture is a command gesture, and the input speed is within a predetermined range, the operation determination unit 214 determines that the command gesture is input.

For example, as illustrated in FIG. 6A, when the relative position of the extension unit 22 with respect to the subject vehicle V is located ahead of the subject vehicle V, the operation determination unit 214 determines whether or not a gesture is input to the front command determination area Cjf. When a gesture is input to the front command determination area Cjf, the operation determination unit 214 determines whether or not the input gesture is the command gesture Gf. Furthermore, when the input gesture is the command gesture Gf, the operation determination unit 214 determines whether or not the input speed of the gesture is within a predetermined range. Then, when the input speed of the gesture is within the predetermined range, the operation determination unit 214 determines that the command gesture is input.

On the other hand, when a gesture is not input to the command determination area set by the operation setting unit 212, the operation determination unit 214 determines that the gesture is not a command gesture. Moreover, even in a case in which a gesture is input to the set command determination area, when the input gesture is not a command gesture, the operation determination unit 214 determines that a command gesture is not input. Furthermore, even in a case in which a gesture that can be determined to be a command gesture is input to the set command determination area, when the input speed of the gesture is not within a predetermined range, the operation determination unit 214 determines that a command gesture is not input. That is, when any of the input position of a gesture, the form of the input gesture, and the input speed of the gesture is different from the content set by the operation setting unit 212, the operation determination unit 214 determines that a command gesture is not input.

For example, as illustrated in FIG. 6B, in a case in which the relative position of the extension unit 22 with respect to the subject vehicle V is located behind the subject vehicle V, when a gesture is not input to the rear command determination area Cjb, the operation determination unit 214 determines that a command gesture is not input. Moreover, even in a case in which a gesture is input to the rear command determination area Cjb, when the input gesture is not the command gesture Gb, the operation determination unit 214 determines that a command gesture is not input. Furthermore, even in a case in which a gesture that can be determined to be the command gesture Gb is input to the rear command determination area Cjb, when the input speed of the gesture is not within a predetermined range, the operation determination unit 214 determines that a command gesture is not input. Also, when the extension unit 22 is located on the right side of the subject vehicle V as illustrated in FIG. 6C or when the extension unit 22 is located on the left side of the subject vehicle V as illustrated in FIG. 6D, the gesture is determined in the same procedure, so the detailed description will be omitted.

The command unit 215 and communication unit 216 of the remote operation device 21 will then be described. As the CPU of a smartphone that serves as the remote operation device 21 operates in accordance with the application, the command unit 215 functions. When the operation determination unit 214 determines that the gesture detected on the touch panel 211 is a command gesture, the command unit 215 generates the execution command signal for controlling the subject vehicle V to execute the autonomous parking control using the autonomous travel control function.

The communication unit 216 uses the communication function which is preliminarily provided in a smartphone that serves as the remote operation device 21. The communication unit 216 is, for example, a wireless communication unit such as that for the Bluetooth (registered trademark) and, in the remote control mode, is connected to a wireless communication unit (not illustrated) equipped in the subject vehicle V. The communication unit 216 receives the relative position between the subject vehicle V and the extension unit 22. The relative position is detected by the position detector 201 of the subject vehicle V. In addition, the communication unit 216 transmits the execution command signal generated by the command unit 215 to the subject vehicle V. A wireless local area network (LAN) such as Wi-Fi (registered trademark), a mobile phone line, or the like may also be used as the communication unit 216.

As illustrated in FIG. 1, the execution command signal transmitted to the subject vehicle V is input to the route following controller 16 and the target vehicle speed generator 17. As described above, the relative position between the subject vehicle V and the extension unit 22 is input from the position detector 201 to the route following controller 16 and the target vehicle speed generator 17. When the distance between the subject vehicle V and the extension unit 22 is within the remote operation distance and the execution command signal from the remote operation device 21 is input, the route following controller 16 outputs the target steering angle to the steering angle controller 18. Likewise, when the distance between the subject vehicle V and the extension unit 22 is within the remote operation distance and the execution command signal from the remote operation device 21 is input, the target vehicle speed generator 17 outputs the target vehicle speed to the vehicle speed controller 19. On the basis of the target steering angle from the route following controller 16, the steering angle controller 18 generates a control signal for operating the steering actuator provided in the steering system of the subject vehicle. On the basis of the target vehicle speed from the target vehicle speed generator 17, the vehicle speed controller 19 generates a control signal for operating the accelerator actuator provided in the drive system of the subject vehicle V.

In the case in which the distance between the subject vehicle V and the extension unit 22 is longer than the remote operation distance, the route following controller 16 does not output the target steering angle to the steering angle controller 18 even when the execution command signal from the remote operation device 21 is input. Likewise, in the case in which the distance between the subject vehicle V and the extension unit 22 is longer than the remote operation distance, the target vehicle speed generator 17 does not output the target vehicle speed to the vehicle speed controller 19 even when the execution command signal from the remote operation device 21 is input. That is, in the case in which the distance between the subject vehicle V and the extension unit 22 is longer than the remote operation distance, the autonomous parking control is not executed even when the command gesture is input from the remote operation device 21.

As described above, in the remote parking system 1 of the present embodiment, the command determination area for the vehicle image 211*a* on the touch panel 211 and the specified command touch operation are set based on the relative position of the extension unit 22 with respect to the subject vehicle V. On the other hand, the operator U inputs a designated touch operation to a position on the touch panel 211, which displays the vehicle image 211*a*, in accordance with the command touch operation input information 211*b*. That position on the touch panel 211 corresponds to a position at which the operator U himself/herself is located. Therefore, the type of the command touch operation and the position of the command determination area, which are set by the operation setting unit 212, and the type of the command touch operation and the position of the command determination area, which are input by the operator U, match each other when the operator U carries the extension unit 22, but do not match each other when the operator U does not carry the extension unit 22.

For example, as illustrated in FIG. 6D, when the operator U stands on the left side of the subject vehicle V while carrying the extension unit 22, the operation setting unit 212 sets the left-side command determination area Cjl for the input position of the command touch operation and sets the command gesture Gl, along which a circular-shaped figure is input counterclockwise, as the specified command touch operation. In response to this, the operator U inputs a circular-shaped figure counterclockwise in the left-side command determination area Cjl of the vehicle image 211*a* in accordance with the command touch operation input information 211*b*, and therefore the type of the command touch operation and the position of the command determination area match those which are set.

On the other hand, as illustrated in FIG. 6E, when the operator U places the extension unit 22 on the left side of the roof of the subject vehicle V in order to extend the operation distance for the remote operation device 21 and is located at a rear position away from the subject vehicle V, the operation setting unit 212 sets the left-side command determination area Cjl for the input position of the command touch operation and sets the command gesture Gl as the specified command touch operation. In response to this, the operator U inputs the command gesture Gb in the rear command determination area Cjb of the vehicle image 211*a* in accordance with the command touch operation input information 211*b*, and therefore the type of the command touch operation and the position of the command determination area do not match those which are set. In this state, even when the operator U continues to input the command touch operation to the remote operation device 21, the subject vehicle V does not execute the autonomous parking control, and the operator U therefore understands that the subject vehicle V cannot be remotely controlled unless the operator U carries the extension unit 22. This can prompt the operator U to operate the remote operation device 21 in a state of carrying the extension unit 22.

Figure 8:
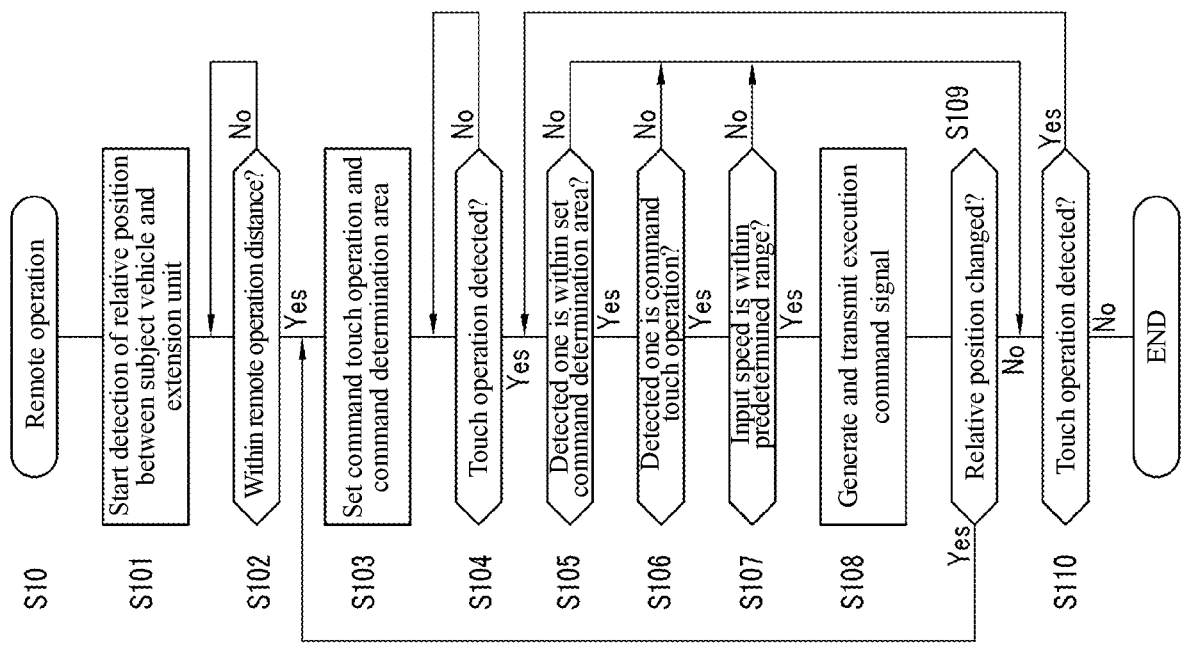
FIG. 8 is a flowchart illustrating a procedure of the remote operation of FIG. 7.

The control flow of the remote parking system 1 of the present embodiment will then be described with reference to FIGS. 7 and 8. Here, a scene will be described in which the reverse parking illustrated in FIG. 2 is executed by the autonomous parking control. FIG. 7 is a flowchart illustrating a control procedure executed in the remote parking system 1 of the present embodiment. FIG. 8 is a flowchart illustrating a procedure in the remote operation device 21 of setting, detecting, and determining the touch operation and transmitting the execution command signal.

First, when the subject vehicle V arrives at the position P1 in the vicinity of the target parking space TPS, in step S1 illustrated in FIG. 7, the operator U such as the driver turns on the remote parking start switch of the onboard target parking space setting device 11 to select the remote entry mode. In step S2, the target parking space setting device 11 searches for one or more available parking spaces for the subject vehicle V using a plurality of onboard cameras or the like. In step S3, the target parking space setting device 11 determines whether or not there are one or more available parking spaces. When there are one or more available parking spaces, the process proceeds to step S4, while when there are no available parking spaces, the process returns to step S1. When no available parking spaces are detected in step S2, the operator may be informed of this fact via a language display or voice, such as "there are no parking spaces," and this process may be concluded.

In step S4, the target parking space setting device 11 controls the onboard display to display the available parking spaces and prompts the operator U to select a desired parking space. When the operator U selects a specific parking space TPS, the target parking space setting device 11 outputs the target parking position information to the parking route generator 14. In step S5, the parking route generator 14 generates the parking routes R1 and R2 illustrated in FIG. 2 from the current position P1 of the subject vehicle V to the parking space TPS which represents a target parking position. The object deceleration calculator 15 calculates the deceleration start timing in the autonomous parking control based on the object information detected by the object detector 13. The parking routes R1 and R2 generated by the parking route generator 14 are output to the route following controller 16, and the deceleration start timing calculated by the object deceleration calculator 15 is output to the target vehicle speed generator 17.

Through the above processes, the autonomous parking control comes into a standby state; therefore, when the operator U is prompted to accept the start of the autonomous parking control and then accepts the start in step S6, the autonomous travel control in the assist mode is started. In the reverse parking illustrated in FIG. 2, once the subject vehicle V moves forward while turning right from the current position P1 and reaches the position of turn for parking P3, the subject vehicle V moves backward while turning left to the intermediate stop position P4.

In step S7, as the position of the subject vehicle V reaches the intermediate stop position P4, the subject vehicle V is stopped and the operator U is prompted to get off the subject vehicle V. When the operator U is prompted to get off the subject vehicle V in step S7 and gets off with the remote operation device 21, step S7 is followed by step S8, in which the operator U activates the remote operation device 21. This starts the remote operation. Examples of the start input for the remote operation by the remote operation device 21 include the activation of the application installed in the remote operation device 21, the operation of unlocking the doors, the operation of locking/unlocking the doors, and the combination of these and the activation of the application. The subject vehicle V is in a stop state during steps S7 to S9.

In step S9, a pairing process between the remote operation device 21 and the subject vehicle V is performed. When the pairing process of step S9 enables the subject vehicle V to authenticate the remote operation device 21 so that the command can be received, the remote operation is started in step S10.

In the remote control using the remote operation device 21, the detection of the relative position of the extension unit 22 with respect to the subject vehicle V, that is, the relative position of the operator U who carries the extension unit 22 is started in step S101 of FIG. 8. The extension unit 22 receives the extension unit search signals transmitted from the antennas 202a to 202d of the subject vehicle V and measures the radio field intensity of the extension unit search signal from each of the antennas 202a to 202d. The extension unit 22 transmits the measured radio field intensity of the extension unit search signal to the base unit 20. The position detector 201 of the base unit 20 detects the relative position of the extension unit 22 with respect to the subject vehicle V based on the radio field intensity from each of the antennas 202a to 202d, which is received from the extension unit 22. Through this operation, when the operator U carries the extension unit 22, the relative position of the operator U with respect to the subject vehicle V can be detected. The position detector 201 outputs the detected relative position to the route following controller 16 and the target vehicle speed generator 17 (these may alternatively be the steering angle controller 18 and the vehicle speed controller 19) and transmits the detected relative position to the remote operation device 21.

In the next step S102, the operation setting unit 212 of the remote operation device 21 determines whether or not the distance between the subject vehicle V and the extension unit 22 is within a predetermined remote operation distance. When the distance between the subject vehicle V and the extension unit 22 is within the predetermined remote operation distance, the operation setting unit 212 determines in the next step S103 the type of the command touch operation, which is received by the remote operation device 21, and the position of the command determination area. For example, when the relative position of the extension unit 22 with respect to the subject vehicle V is located on the right side of the subject vehicle V as illustrated in FIG. 6C, the operation setting unit 210 sets the right-side command determination area Cjr on the right side of the vehicle image 211a for the input position of the command touch operation. The operation setting unit 212 also sets the command gesture Gr as the specified command touch operation.

When the operation determination unit 214 detects in step S104 the touch operation input to the touch panel 211, the operation determination unit 214 determines in the next step S105 whether or not the touch operation is performed in the right-side command determination area Cjr. When the touch operation is input to the right-side command determination area Cjr, the operation determination unit 214 determines in the next step S106 whether or not the input touch operation is the command gesture Gr. Furthermore, when the input touch operation is the command gesture Gr, the operation determination unit 214 determines in the next step S107 whether or not the input speed of the gesture is within a predetermined range. Thus, when the input position of the touch operation is in the right-side command determination area Cjr, the input touch operation is the command gesture Gr, and the input speed is within the predetermined range, the operation determination unit 214 determines that the command touch operation is input.

When the detected touch operation is the command gesture Gr, the process proceeds to the next step S108, in which the command unit 215 generates the execution command signal, and the communication unit 216 transmits the execution command signal to the subject vehicle V. In the next step S109, when the relative position between the subject vehicle V and the extension unit 22 is changed to such an extent that it is necessary to change the command touch operation and the command determination area, the process returns to step S103, in which the command touch operation and the command determination area are set again. The case in which the relative position between the subject vehicle V and the extension unit 22 is changed to such an extent that it is necessary to change the command touch operation and the command determination area refers, for example, to a case in which the extension unit 22 located on the right side of the subject vehicle V moves to ahead of the subject vehicle V, moves to behind the subject vehicle V, or moves to the left side of the subject vehicle V. In the next step S110, when the detection of the command touch operation is continued, the process returns to step S105, from which the determination of the command touch operation and the transmission of the execution command signal are repeated.

On the other hand, as illustrated in FIG. 6E, when the operator U places the extension unit 22 on the left side of the roof of the subject vehicle V in order to extend the operation distance for the remote operation device 21 and is located at a rear position away from the subject vehicle V, the operation setting unit 212 sets the left-side command determination area Cjl for the input position of the command touch operation and sets the command gesture Gl as the specified command touch operation. In response to this, the operator U inputs the command gesture Gb in the rear command determination area Cjb of the vehicle image 211a in accordance with the command touch operation input information 211b; therefore, in step S105, a determination is made that the input position of the command touch operation is different. In addition, in step S106, a determination is made that the input touch operation is not the command gesture Gl. Thus, when the operator U operates the remote operation device 21 without carrying the extension unit 22, the execution command signal is not transmitted to the subject vehicle V.

Referring again to FIG. 7, in step S11, when the distance between the subject vehicle V and the extension unit 22 is within the remote operation distance and the execution command signal from the remote operation device 21 is input, the route following controller 16 outputs the target steering angle to the steering angle controller 18. Likewise, when the distance between the subject vehicle V and the extension unit 22 is within the remote operation distance and the execution command signal from the remote operation device 21 is input, the target vehicle speed generator 17 outputs the target vehicle speed to the vehicle speed controller 19. On the basis of the target steering angle from the route following controller 16, the steering angle controller 18 generates a control signal for operating the steering actuator provided in the steering system of the subject vehicle. On the basis of the target vehicle speed from the target vehicle speed generator 17, the vehicle speed controller 19 generates a control signal for operating the accelerator actuator provided in the drive system of the subject vehicle V. This allows the autonomous parking control to be executed in the next step S12.

The processes from step S10 to step S13, which is to be described below, are executed at predetermined time intervals until the subject vehicle V arrives at the target parking space TPS in step S13. In step S13, a determination is made as to whether or not the subject vehicle V has arrived at the target parking space TPS. When the subject vehicle V has not arrived at the parking space TPS, the process returns to step S10, while when the subject vehicle V has arrived at the target parking space TPS, the subject vehicle V is stopped and the process is concluded. Thus, the autonomous travel control in the assist mode is executed along the travel route from the current position P1 of the subject vehicle V to the intermediate stop position P4, and the autonomous travel control in the remote control mode is executed along the travel route from the intermediate stop position P4 to the target parking space TPS.

As described above, according to the remote parking system 1 of the present embodiment to which the vehicle remote control method and remote control device of the present invention are applied, the relative position between the subject vehicle V and the extension unit 22 located outside the subject vehicle V is detected using the extension unit 22 and the base unit 20, and the operation setting unit 212 sets, in accordance with the detected relative position, the command touch operation for operating the subject vehicle V with the remote operation device 21. When the touch operation of the operator U is detected by the touch panel 211 of the remote operation device 21, the operation determination unit 214 determines whether or not the detected touch operation is a command touch operation, and when the touch operation is a command touch operation, the subject vehicle having the autonomous travel control function is controlled to execute the autonomous travel control. In this operation, the command touch operation which is set by the operation setting unit 212 and the touch operation which is input by the operator U match each other when the operator U carries the extension unit 22, but may not match each other when the operator U does not carry the extension unit 22. When the command touch operation which is set by the operation setting unit 212 and the touch operation which is input by the operator U do not match each other, the subject vehicle V does not execute the autonomous parking control, and the operator U therefore understands that the subject vehicle V cannot be remotely controlled unless the operator U carries the extension unit 22. This can prompt the operator U to operate the remote operation device 21 in a state of carrying the extension unit 22.

In addition, according to the remote parking system 1 of the present embodiment, different command touch operations are set in accordance with the relative position between the subject vehicle V and the extension unit 22. Therefore, even when the operator U inputs the command touch operation, it may not be determined as the command touch operation depending on the relative position. When the command touch operation which is set by the operation setting unit 212 and the touch operation which is input by the operator U do not match each other, the subject vehicle V does not execute the autonomous parking control, and the operator U therefore understands that the subject vehicle V cannot be remotely controlled unless the operator U carries the extension unit 22. This can prompt the operator U to operate the remote operation device 21 in a state of carrying the extension unit 22.

Moreover, according to the remote parking system 1 of the present embodiment, the command touch operation input information 211b is presented to the operator U of the remote operation device 21 so as to prompt the operator U to input the command touch operation which is set in accordance with the relative position. The operator U can input the command touch operation in accordance with the command touch operation input information 211b, and it is possible to suppress the input of an erroneous touch operation.

Furthermore, according to the remote parking system 1 of the present embodiment, the operation setting unit 212 sets a command determination area on the touch panel 211 in accordance with the relative position between the subject vehicle V and the extension unit 22. The command determination area receives the touch operation of the operator U as the command touch operation. In addition, the operation determination unit 214 determines whether or not the detected touch operation is an operation in the command determination area, and when a determination is made that the touch operation is an operation in the command determination area, the subject vehicle V is controlled to execute the autonomous travel control. In this operation, the command determination area which is set by the operation setting unit 212 and the position at which the operator U inputs the touch operation match each other when the operator U carries the extension unit 22, but may not match each other when the operator U does not carry the extension unit 22. When the command determination area which is set by the operation setting unit 212 and the position at which the operator U inputs the touch operation do not match each other, the subject vehicle V does not execute the autonomous parking control, and the operator U therefore understands that the subject vehicle V cannot be remotely controlled unless the operator U carries the extension unit 22. This can prompt the operator U to operate the remote operation device 21 in a state of carrying the extension unit 22.

In addition, according to the remote parking system 1 of the present embodiment, the operation setting unit 212 sets a command gesture as the command touch operation in accordance with the relative position between the subject vehicle V and the extension unit 22. The command gesture is for operating the vehicle V by the remote operation device 21. In addition, the operation determination unit 214 determines whether or not the input touch operation is the command gesture, and when a determination is made that the input touch operation is the command gesture, the subject vehicle V is controlled to execute the autonomous travel control. In this operation, the command gesture which is set by the operation setting unit 212 and the touch operation which is input by the operator U match each other when the operator U carries the extension unit 22, but may not match each other when the operator U does not carry the extension unit 22. When the command gesture which is set by the operation setting unit 212 and the touch operation which is input by the operator U do not match each other, the subject vehicle V does not execute the autonomous parking control, and the operator U therefore understands that the subject vehicle V cannot be remotely controlled unless the operator U carries the extension unit 22. This can prompt the operator U to operate the remote operation device 21 in a state of carrying the extension unit 22.

Moreover, according to the remote parking system 1 of the present embodiment, the operation setting unit 212 sets a command determination area on the touch panel 211 and a command gesture as the command touch operation in accordance with the relative position between the subject vehicle V and the extension unit 22. The command determination area receives the touch operation of the operator as the command touch operation. The command gesture is for operating the subject vehicle V by the remote operation device 21. In addition, the operation determination unit 214 determines whether or not the detected touch operation is an operation in the command determination area and is the command gesture, and when a determination is made that the detected touch operation is an operation in the command determination area and is the command gesture, the subject vehicle V is controlled to execute the autonomous travel control. In this operation, the command gesture and the command determination area which are set by the operation setting unit 212, and the touch operation input by the operator U and the position at which the operator U inputs the touch operation, match each other when the operator U carries the extension unit 22, but may not match each other when the operator U does not carry the extension unit 22. When the command gesture and the command determination area which are set by the operation setting unit 212, and the touch operation input by the operator U and the position at which the operator U inputs the touch operation, do not match each other, the subject vehicle V does not execute the autonomous parking control, and the operator U therefore understands that the subject vehicle V cannot be remotely controlled unless the operator U carries the extension unit 22. This can prompt the operator U to operate the remote operation device 21 in a state of carrying the extension unit 22.

Furthermore, according to the remote parking system 1 of the present embodiment, the operation setting unit 212 sets the command determination area with reference to an image of the subject vehicle V displayed on the touch panel 211; therefore, when the operator U inputs the command touch operation in accordance with the relative position between the subject vehicle V and the extension unit 22, it is easy for the operator U to understand the position of the command determination area for inputting the command touch operation.

In addition, according to the remote parking system 1 of the present embodiment, when the relative position of the extension unit 22 with respect to the subject vehicle V is located ahead of the subject vehicle V, a touch operation of sliding a finger frontward ahead of the vehicle image 211*a* along the front-rear direction of the vehicle image 211*a* is set as the command gesture. Additionally or alternatively, when the relative position of the extension unit 22 with respect to the subject vehicle V is located behind the subject vehicle V, a touch operation of sliding a finger rearward behind the vehicle image 211*a* along the front-rear direction of the vehicle image 211*a* is set as the command gesture. Additionally or alternatively, when the relative position of the extension unit 22 with respect to the subject vehicle V is located on the right side of the subject vehicle V, a touch operation of sliding a finger in a circular shape along the first circumferential direction is set as the command gesture. Additionally or alternatively, when the relative position of the extension unit 22 with respect to the subject vehicle V is located on the left side of the subject vehicle V, a touch operation of sliding a finger in a circular shape along the second circumferential direction opposite to the first circumferential direction is set as the command gesture. Thus, a gesture related to the relative position between the subject vehicle V and the extension unit 22 is set as the command gesture in accordance with the relative position, and it is therefore easy for the operator U to understand the input of the command gesture made by the operator U.

Moreover, according to the remote parking system 1 of the present embodiment, when the command touch operation becomes not detected, the subject vehicle V is controlled to stop the autonomous parking control. Therefore, the operation of controlling the subject vehicle V to stop the autonomous parking control is not necessary, and the remote operation of the subject vehicle V is thus easy.

Furthermore, according to the remote parking system 1 of the present embodiment, the parking control for parking the subject vehicle V is performed as the autonomous travel control, and the subject vehicle V can therefore be remotely operated and parked from a distant position.

Second Embodiment

The description will then be made for a second embodiment of the remote parking system to which the remote control method and remote control device for a vehicle of the present invention are applied. For the same configurations as those of the first embodiment, the same reference numerals as those of the first embodiment will be used, and detailed description thereof will be omitted.

Figure 9:
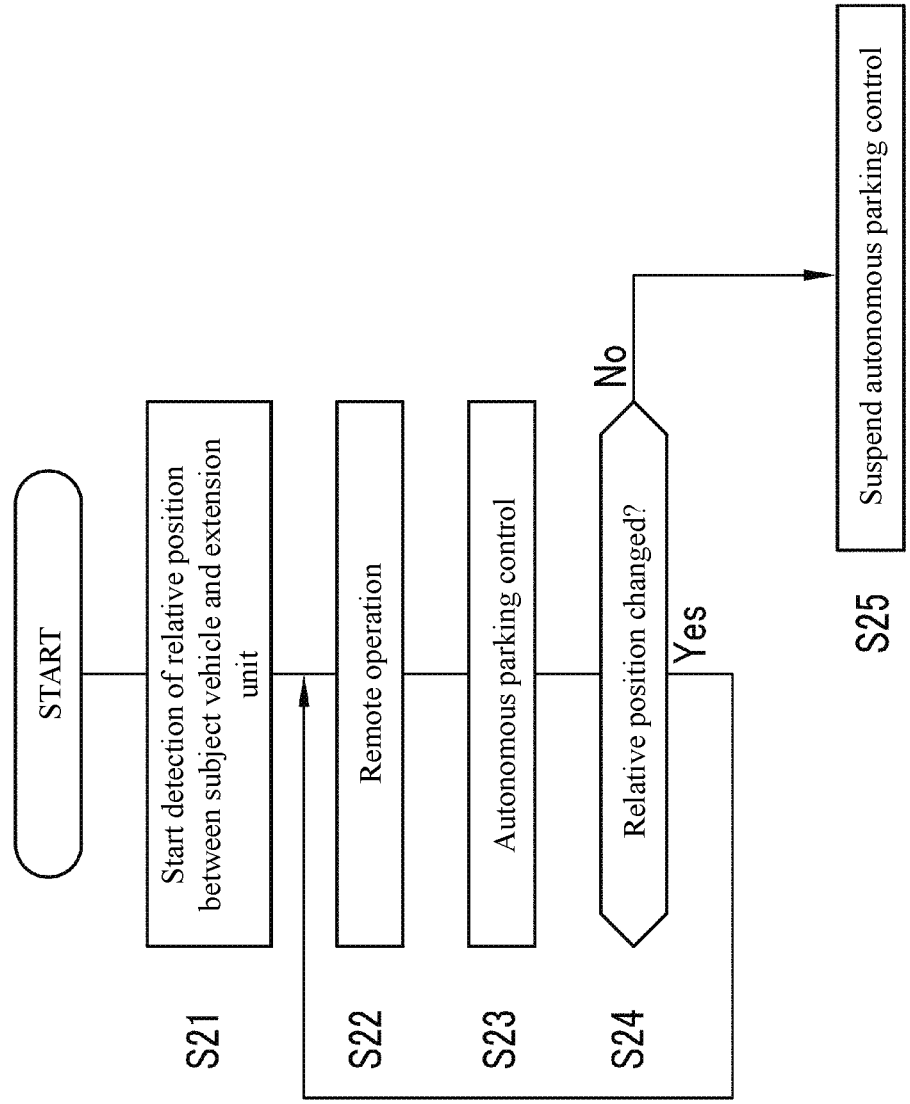
FIG. 9 is a flowchart illustrating a control procedure of suspending or prohibiting autonomous travel control of the subject vehicle during execution of the autonomous travel control in a second embodiment.

In the present embodiment, a control procedure for suspending or prohibiting the autonomous travel control of the subject vehicle V during execution of the autonomous travel control will be described. As illustrated in the flowchart of FIG. 9, it is assumed that the detection of the relative position of the extension unit 22 with respect to the subject vehicle V is started in step S21, the remote operation using the remote operation device 21 is started in step S22, and the subject vehicle V executes the autonomous parking control in step S23. Step S21 is the same as step S101 of the flowchart illustrated in FIG. 8, and steps S22 and S23 are the same as steps S10 and S12 of the flowchart illustrated in FIG. 7, so the detailed description will be omitted.

As illustrated in FIG. 1, the relative position between the subject vehicle V and the extension unit 22, which is output from the base unit 20, is input to the route following controller 16 and target vehicle speed generator 17 (these may alternatively be the steering angle controller 18 and the vehicle speed controller 19) of the subject vehicle V. In step S24, the route following controller 16 and the target vehicle speed generator 17 compare the relative position between the subject vehicle V and the extension unit 22, which is input after the start of the autonomous parking control of the subject vehicle V, with the relative position before the start of the autonomous parking control. Then, when the relative position does not change, a determination is made that the extension unit 22 is placed on the roof of the subject vehicle V as illustrated in FIG. 6E, and in step S25, the autonomous parking control of the subject vehicle V is suspended or prohibited.

Thus, according to the remote parking system 1 of the present embodiment, when the relative position between the subject vehicle V and the extension unit 22 does not change due to the movement of the subject vehicle V by the autonomous travel control, the autonomous travel control of the subject vehicle V is stopped. This can suspend or prohibit the autonomous parking control of the subject vehicle V even when it is found, during the execution of the autonomous parking control by the subject vehicle V, that the operator U does not carry the extension unit 22.

Third Embodiment

The description will then be made for a third embodiment of the remote parking system to which the remote control method and remote control device for a vehicle of the present invention are applied. For the same configurations as those of the first embodiment, the same reference numerals as those of the first embodiment will be used, and detailed description thereof will be omitted.

Figure 10:
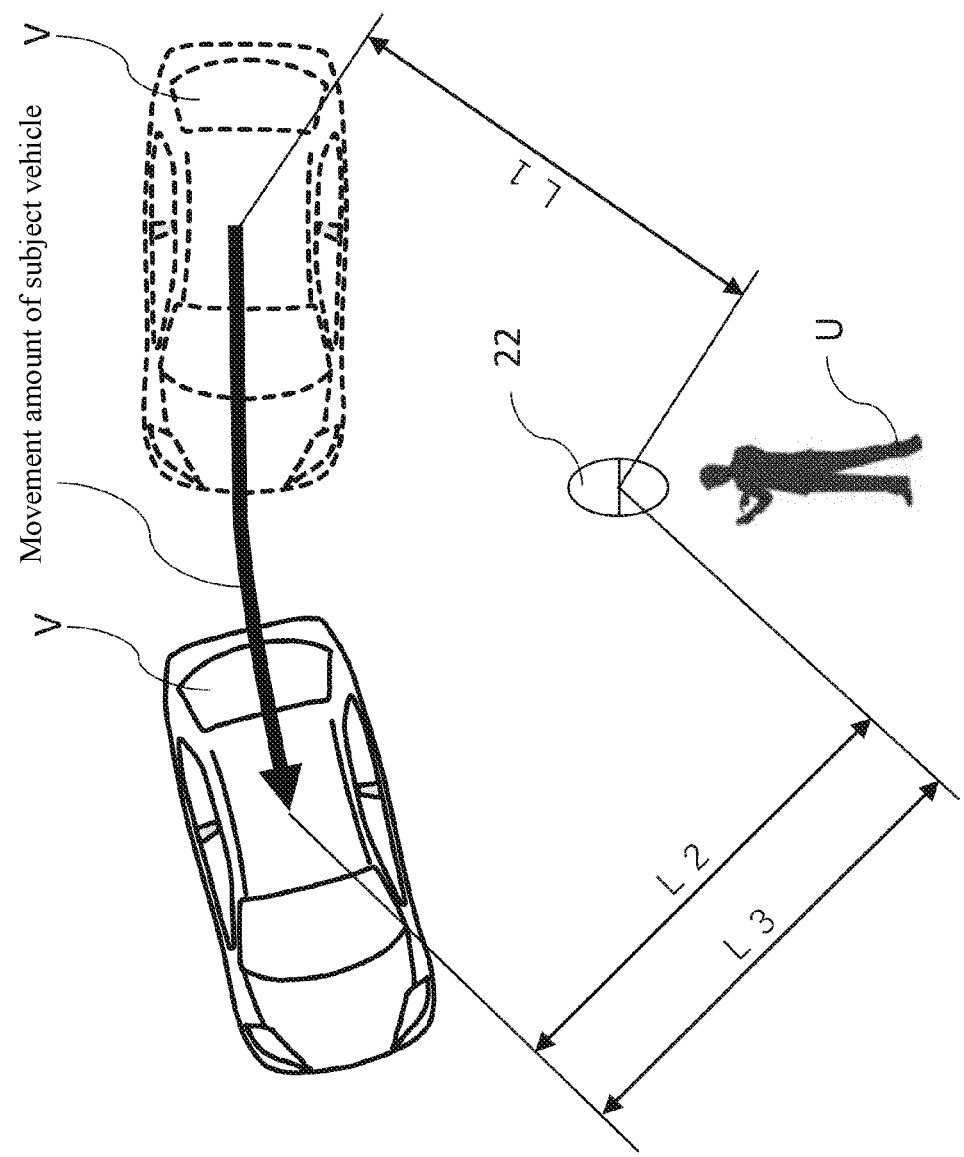
FIG. 10 is an explanatory view illustrating a control procedure when permitting autonomous travel control of the subject vehicle during execution of the autonomous travel control in a third embodiment.
Figure 11:
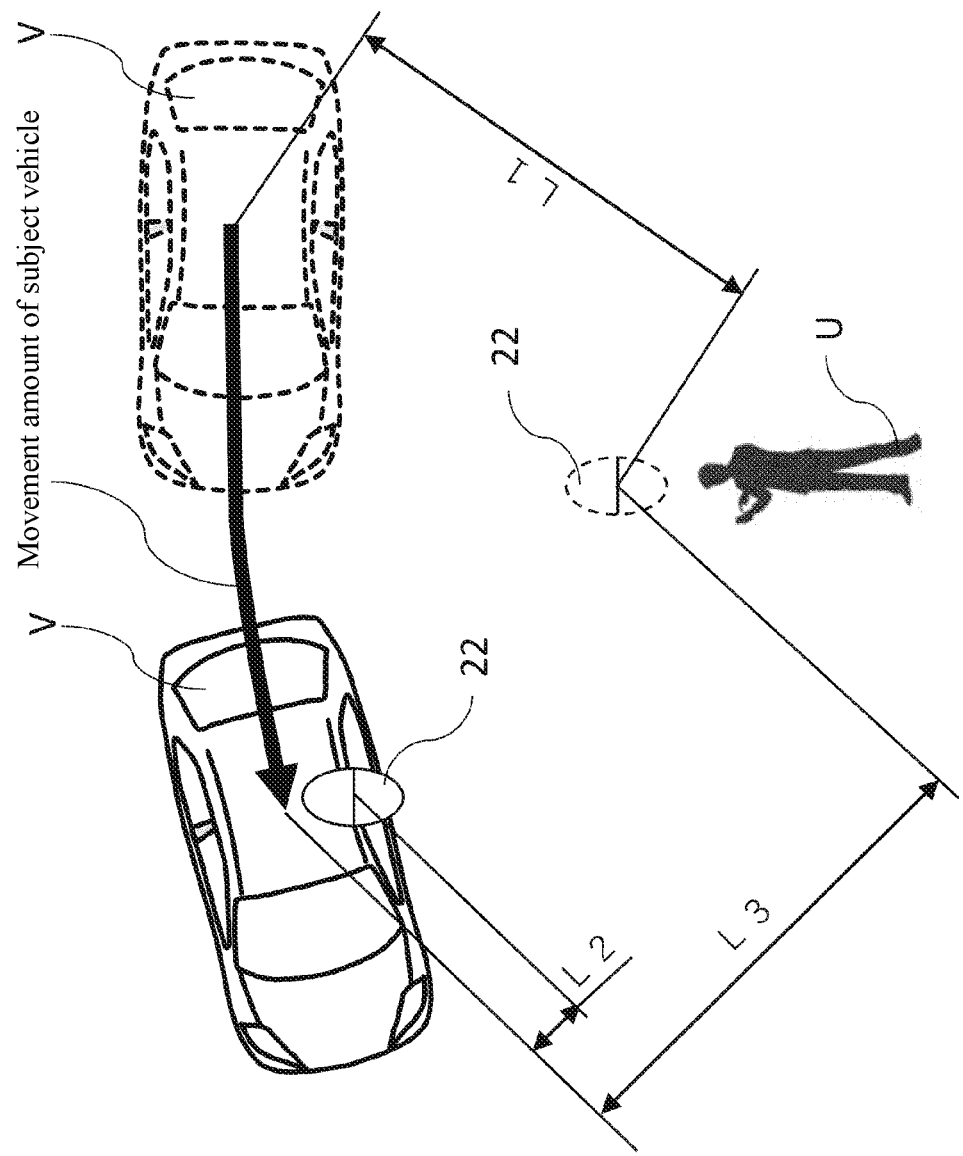
FIG. 11 is an explanatory view illustrating a control procedure when suspending or prohibiting autonomous travel control of the subject vehicle during execution of the autonomous travel control in the third embodiment.

As in the second embodiment, the present embodiment provides a control procedure for suspending or prohibiting the autonomous travel control of the subject vehicle V during the execution of the autonomous travel control. FIG. 10 illustrates an example in which the subject vehicle V moves by the autonomous parking control from the position on the right side indicated by the broken lines to the position on the left side indicated by the solid lines. In the present embodiment, the position detector 201 calculates a relative position estimated value L3 after the movement based on a first relative position L1 between the subject vehicle V and the extension unit 22 before the start of movement and the movement amount of the subject vehicle V. The movement amount of the subject vehicle V is calculated using a wheel speed sensor and a steering wheel angle sensor. The position detector 201 also detects a second relative position L2 between the subject vehicle V and the extension unit 22 after the movement. As illustrated in FIG. 10, when the relative position estimated value L3 and the second relative position L2 after the movement match each other, a determination is made that the operator U carries the extension unit 22, and the autonomous parking control of the subject vehicle V is permitted. On the other hand, as illustrated in FIG. 11, when the relative position estimated value L3 and the second relative position L2 after the movement do not match each other, a determination can be made that the operator U does not carry the extension unit 22, such as due to the extension unit 22 being placed on the roof of the subject vehicle V. The autonomous parking control of the subject vehicle V is therefore suspended or prohibited.

Thus, according to the remote parking system 1 of the present embodiment, the relative position estimated value L3 of the extension unit 22 with respect to the subject vehicle V is calculated based on the first relative position L1 of the extension unit 22 with respect to the subject vehicle V, which is detected before the start of the autonomous travel control by the subject vehicle V, and the movement distance by the autonomous travel control of the subject vehicle V. In addition, when the autonomous travel control of the subject vehicle V is being executed, the second relative position L2 of the extension unit 22 with respect to the subject vehicle V is detected. Then, when the relative position estimated value L3 and the second relative position L2 match each other, the autonomous travel control of the subject vehicle V is permitted, while when the relative position estimated value L3 and the second relative position L2 do not match each other, the autonomous travel control of the subject vehicle V is stopped. This can suspend or prohibit the autonomous parking control of the subject vehicle V even when it is found, during the execution of the autonomous parking control by the subject vehicle V, that the operator U does not carry the extension unit 22.

Fourth Embodiment

The description will then be made for a fourth embodiment of the remote parking system to which the remote control method and remote control device for a vehicle of the present invention are applied. For the same configurations as those of the first embodiment, the same reference numerals as those of the first embodiment will be used, and detailed description thereof will be omitted.

Figure 12:
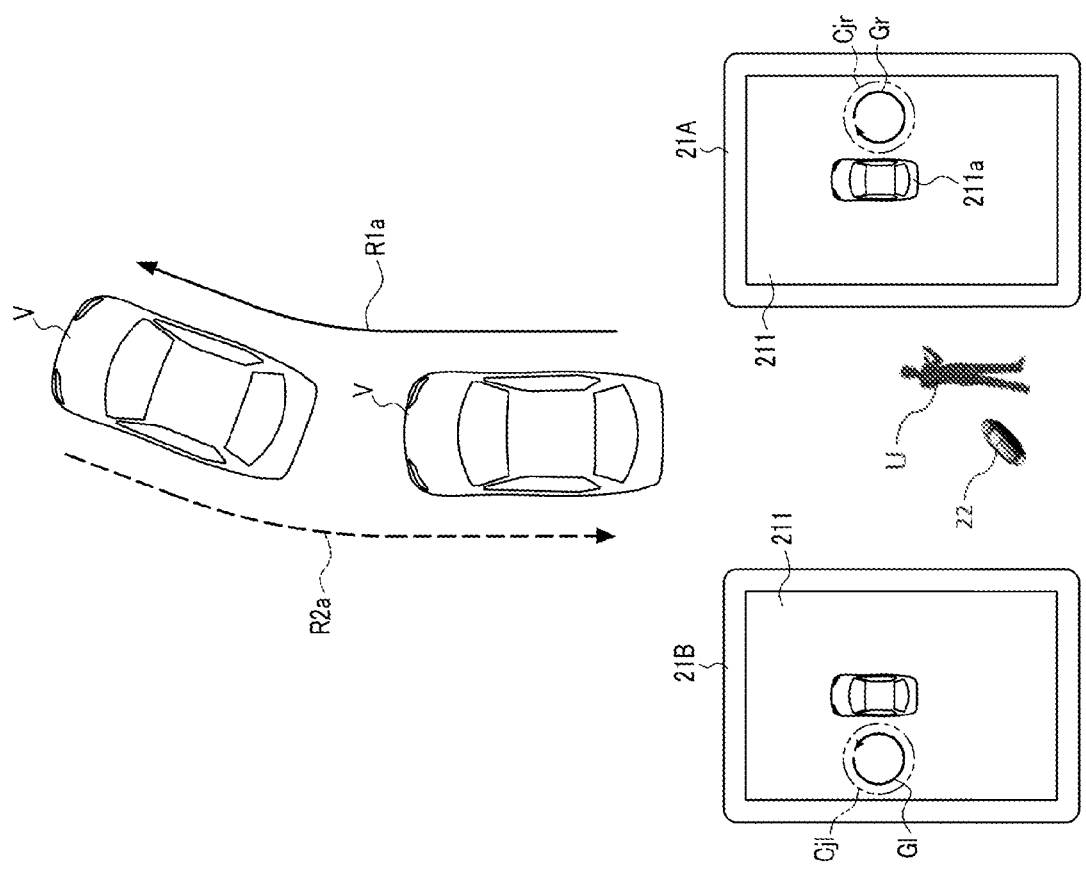
FIG. 12 is an explanatory view illustrating command touch operations when turning clockwise while moving the subject vehicle forward and when turning counterclockwise while moving the subject vehicle backward in a fourth embodiment.

In the present embodiment, when the command touch operation is set by the operation setting unit 212, a different type of command touch operation is set for each direction in which the subject vehicle V turns by the autonomous travel control. For example, as illustrated in FIG. 12, when the subject vehicle V turns right while moving forward along a route R1a, that is, when the subject vehicle V turns clockwise, then, as indicated on a remote operation device 21A, the right-side command determination area Cjr on the right side of the vehicle image 211a is set as the specified command determination area, and the command gesture Gr of drawing a circular-shaped figure in the clockwise direction is set as the specified command touch operation. On the other hand, when the subject vehicle V turns left while moving backward along a route R2a, that is, when the subject vehicle V turns counterclockwise, then, as indicated on a remote operation device 21B, the left-side command determination area Cjl on the left side of the vehicle image 211a is set as the specified command determination area, and the command gesture Gl of drawing a circular-shaped figure in the counterclockwise direction is set as the specified command touch operation.

Figure 13:
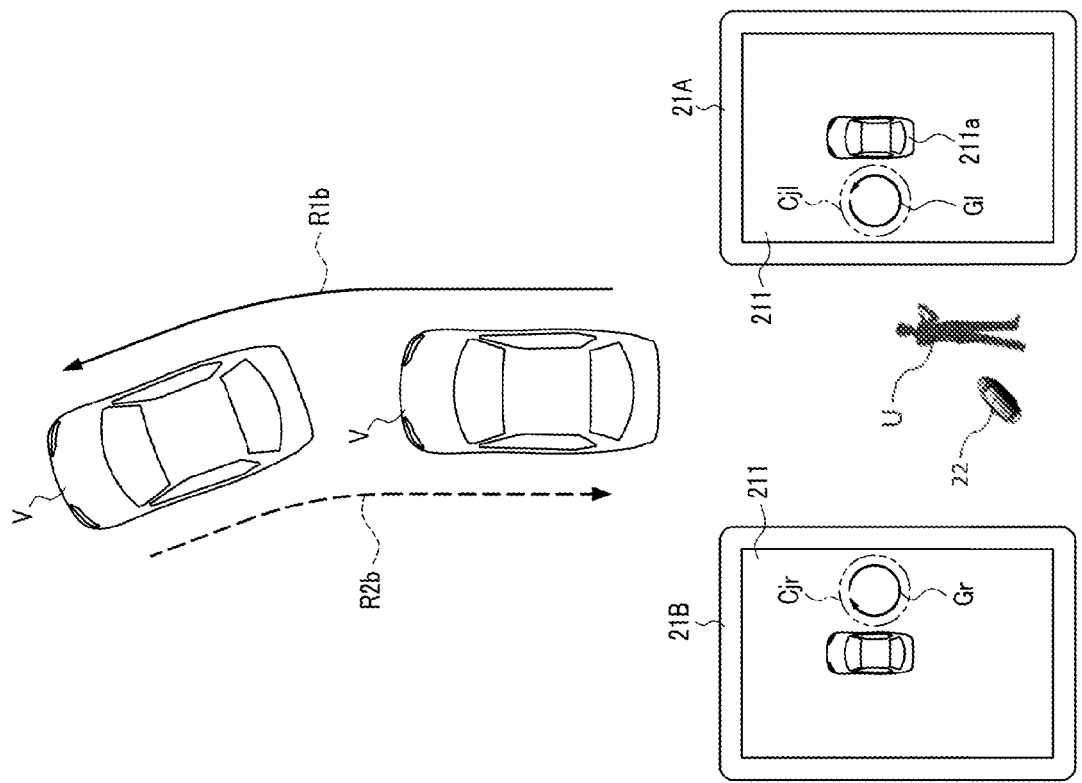
FIG. 13 is an explanatory view illustrating command touch operations when turning counterclockwise while moving the subject vehicle forward and when turning clockwise while moving the subject vehicle backward in the fourth embodiment.

As illustrated in FIG. 13, when the subject vehicle V turns left while moving forward along a route R1b, that is, when the subject vehicle V turns counterclockwise, then, as indicated on the remote operation device 21A, the left-side command determination area Cjl on the left side of the vehicle image 211a is set as the specified command determination area, and the command gesture Gl of drawing a circular-shaped figure in the counterclockwise direction is set as the specified command touch operation. On the other hand, when the subject vehicle V turns right while moving backward along the a route R2b, that is, when the subject vehicle V turns clockwise, then, as indicated on the remote operation device 21B, the right-side command determination area Cjr on the right side of the vehicle image 211a is set as the specified command determination area, and the command gesture Gr of drawing a circular-shaped figure in the clockwise direction is set as the specified command touch operation.

Thus, according to the remote parking system 1 of the present embodiment, the command touch operation is set to a different type for each direction in which the subject vehicle V turns by the autonomous travel control. More specifically, when the turning direction of the subject vehicle V is clockwise, the clockwise touch operation is set as the command gesture. When the turning direction of the subject vehicle V is counterclockwise, the counterclockwise touch operation is set as the command gesture. This allows the turning direction of the subject vehicle V and the operation direction of the command gesture to match each other, and it is thus easy for the operator U to understand the input of the command touch operation.

In the above first to fourth embodiments, an example of using the command gesture of sliding a finger on the touch panel 211 or other similar command gesture as the command touch operation has been described, but as described above, the command touch operation is not limited to a gesture, and various touch operations other than gestures may be used as command touch operations, provided that the operation can be detected by the touch panel 211. For example, such other touch operations that can be used as command touch operations include a touch operation of pressing a predetermined position on the touch panel 211, a button displayed on the touch panel 211, or the like a predetermined number of times or more or for a predetermined time or more. Moreover, the command touch operation is not limited to the case of touch operation with one finger, and a touch operation of moving two or more fingers in the same direction or different directions may also be used as the command touch operation.

| [Description of Reference Numerals] | |
|---|---|
| 1 | Remote parking system |
| 11 | Target parking space setting device |
| 12 | Vehicle position detector |
| 13 | Object detector |
| 14 | Parking route generator |
| 15 | Object deceleration calculator |
| 16 | Route following controller |
| 17 | Target vehicle speed generator |
| 18 | Steering angle controller |
| 19 | Vehicle speed controller |
| 20 | Base unit |
| 22 | Extension unit |
| 21 | Remote operation device |
| 211 | Touch panel |
| 212 | Operation setting unit |
| 213 | Presentation unit |
| 214 | Operation determination unit |
| 212a | Vehicle image |
| 212b | Gesture input information |
| 215 | Command unit |
| 216 | Communication unit |
| Gf, Gb, Gr, Gl | Command gesture (command touch operation) |
| Cjf, Cjb, Cjr, Cjl | Command determination area |
| Ga0, Ga1, Ga2 | Gesture determination area |
| V | Subject vehicle |
| L1 | First relative position |
| L2 | Second relative position |
| L3 | Relative position estimated value |
| TPS | Target parking space |
| R1, R2 | Parking route |
| W | Wall (obstacle) |
| H1, H2 | House (obstacle) |
| WD | Garden tree (obstacle) |

The invention claimed is:

1. A vehicle remote control method executed by a remote control system comprising a base unit equipped in a vehicle, an extension unit that an operator carries, and a remote operation device for remotely operating the vehicle, wherein wireless communication is established between the base unit and the extension unit, wherein the remote operation device is different from the extension unit, and wherein the remote control system is configured to:
 detect a relative position of the extension unit with respect to the vehicle using the extension unit and the base unit;
 set, in accordance with the relative position of the extension unit, a command touch operation for operating the vehicle with the remote operation device, wherein the command touch operation is a command gesture;
 detect a touch operation that the operator inputs to a touch panel of the remote operation device;
 determine whether or not the touch operation detected is the command gesture; and
 when the touch operation is determined to be the command gesture, execute remote control of the vehicle.

2. The vehicle remote control method according to claim 1, wherein the remote control system is further configured to:
 seta different command gesture in accordance with the relative position.

3. The vehicle remote control method according to claim 1, wherein the remote control system is further configured to:
 present gesture input information to the operator of the remote operation device so as to prompt the operator to input the command gesture which is set in accordance with the relative position.

4. The vehicle remote control method according to claim 1, wherein the remote control system is further configured to:
 when the relative position of the extension unit with respect to the vehicle is located ahead of the vehicle, set as the command gesture a touch operation of sliding a finger frontward ahead of an image of the vehicle along a front-rear direction of the image of the vehicle.

5. The vehicle remote control method according to claim 1, wherein the remote control system is further configured to:
 when the relative position of the extension unit with respect to the vehicle is located behind the vehicle, set as the command gesture a touch operation of sliding a finger rearward behind an image of the vehicle along a front-rear direction of the image of the vehicle.

6. The vehicle remote control method according to claim 1, wherein the remote control system is further configured to:
 when the relative position of the extension unit with respect to the vehicle is located on a right side of the vehicle, set as the command gesture a touch operation of sliding a finger in a circular shape along a first circumferential direction.

7. The vehicle remote control method according to claim 6, wherein the remote control system is further configured to:
 when the relative position of the extension unit with respect to the vehicle is located on a left side of the vehicle, set as the command gesture a touch operation of sliding a finger in a circular shape along a second circumferential direction opposite to the first circumferential direction.

8. The vehicle remote control method according to claim 1, wherein the command gesture is set to a different type for each direction in which the vehicle turns by the remote control.

9. The vehicle remote control method according to claim 8, wherein the remote control system is further configured to:
 when the direction in which the vehicle turns is clockwise, set a clockwise touch operation as the command gesture.

10. The vehicle remote control method according to claim 8, wherein the remote control system is further configured to:
 when the direction in which the vehicle turns is counterclockwise, set a counterclockwise touch operation as the command gesture.

11. The vehicle remote control method according to claim 1, wherein the remote control system is further configured to:
 when the touch operation becomes not detected, stop the remote control of the vehicle.

12. The vehicle remote control method according to claim 1, wherein the remote control is parking control of parking the vehicle.

13. A vehicle remote control method executed by a remote control system comprising a base unit equipped in a vehicle, an extension unit that an operator carries, and a remote operation device for remotely operating the vehicle, wherein wireless communication is established between the base unit and the extension unit, wherein the remote operation device is different from the extension unit, and wherein the remote control system is configured to:
 detect a relative position of the extension unit with respect to the vehicle using the extension unit and the base unit;
 set, in accordance with the relative position of the extension unit, a command touch operation for operating the vehicle with the remote operation device;

set a command determination area on a touch panel in accordance with the relative position, the command determination area receiving a touch operation of the operator as the command touch operation;

detect the touch operation that the operator inputs to the touch panel of the remote operation device;

determine whether or not the touch operation detected is an operation in the command determination area; and when the touch operation is determined to be the operation in the command determination area, execute remote control of the vehicle.

14. The vehicle remote control method according to claim 13, wherein the command determination area is set with reference to an image of the vehicle displayed on the touch panel.

15. A vehicle remote control method executed by a remote control system comprising a base unit equipped in a vehicle, an extension unit that an operator carries, and a remote operation device for remotely operating the vehicle, wherein wireless communication is established between the base unit and the extension unit, wherein the remote operation device is different from the extension unit, and wherein the remote control system is configured to:

detect a relative position of the extension unit with respect to the vehicle using the extension unit and the base unit;

set in accordance with the relative position of the extension unit, a command touch operation for operating the vehicle with the remote operation device;

set a command determination area on a touch panel and a command gesture as the command touch operation in accordance with the relative position, the command determination area receiving a touch operation of the operator and the command gesture being for operating the vehicle with the remote operation device;

detect the touch operation that the operator inputs to the touch panel of the remote operation device;

determine whether or not the touch operation detected is an operation in the command determination area and is the command gesture; and when the touch operation is determined to be the operation in the command determination area and is the command gesture, execute remote control of the vehicle.

16. A vehicle remote control method executed by a remote control system comprising a base unit equipped in a vehicle, an extension unit that an operator carries, and a remote operation device for remotely operating the vehicle, wherein wireless communication is established between the base unit and the extension unit, wherein the remote operation device is different from the extension unit, and wherein the remote control system is configured to:

detect a relative position of the extension unit with respect to the vehicle using the extension unit and the base unit; and while controlling the vehicle to execute the autonomous travel executing remote control of the vehicle, when the relative position of the extension unit does not change due to movement of the vehicle by the remote control, stop the remote control of the vehicle.

17. A vehicle remote control method executed by a remote control system comprising a base unit equipped in a vehicle, an extension unit that an operator carries, and a remote operation device for remotely operating the vehicle, wherein wireless communication is established between the base unit and the extension unit, wherein the remote operation device is different from the extension unit, and wherein the remote control system is configured to:

detect a relative position of the extension unit with respect to the vehicle using the extension unit and the base unit;

calculate a relative position estimated value of the extension unit with respect to the vehicle based on a first relative position of the extension unit with respect to the vehicle and a movement distance by remote control of the vehicle, the first relative position detected before start of the remote control of the vehicle;

detect a second relative position of the extension unit with respect to the vehicle when executing the remote control of the vehicle;

when the relative position estimated value and the second relative position match each other, permit the remote control of the vehicle; and when the relative position estimated value and the second relative position do not match each other, stop the remote control of the vehicle.

18. A vehicle remote control system comprising:

a base unit equipped in a vehicle;

an extension unit that an operator carries, wherein wireless communication is established between the base unit and the extension unit;

a remote operation device for remotely operating the vehicle, the remote operation device comprising a touch panel configured to detect a touch operation inputted by the operator, wherein the remote operation device is different from the extension unit;

an operation setting unit configured to:
  detect a relative position of the extension unit with respect to the vehicle; using the extension unit and the base unit; and
  set, in accordance with the relative position of the extension unit, a command touch operation for operating the vehicle with the remote operation device, wherein the command touch operation is a command gesture;

an operation determination unit configured to determine whether or not the touch operation detected is the command gesture; and a command unit configured to when the touch operation is determined to be the command gesture, execute remote control of the vehicle.

* * * * *